US011991953B2

(12) United States Patent
Bryant et al.

(10) Patent No.: US 11,991,953 B2
(45) Date of Patent: May 28, 2024

(54) ELECTRONIC CONTROLLER AND TURF MAINTENANCE VEHICLE INCORPORATING SAME

(71) Applicant: Exmark Manufacturing Company, Incorporated, Beatrice, NE (US)

(72) Inventors: Christian S. C. Bryant, Lincoln, NE (US); Trevor M. Porter, Lincoln, NE (US)

(73) Assignee: EXMARK MANUFACTURING COMPANY, INCORPORATED, Beatrice, NE (US)

( * ) Notice: Subject to any disclaimer, the term of this patent is extended or adjusted under 35 U.S.C. 154(b) by 157 days.

(21) Appl. No.: 17/577,757

(22) Filed: Jan. 18, 2022

(65) Prior Publication Data

US 2022/0132730 A1 May 5, 2022

Related U.S. Application Data

(63) Continuation of application No. 16/884,688, filed on May 27, 2020, now abandoned, which is a
(Continued)

(51) Int. Cl.
*A01D 34/00* (2006.01)
*A01D 69/00* (2006.01)
(Continued)

(52) U.S. Cl.
CPC ......... *A01D 34/008* (2013.01); *A01D 69/002* (2013.01); *G07C 5/006* (2013.01); *A01D 2101/00* (2013.01)

(58) Field of Classification Search
None
See application file for complete search history.

(56) References Cited

U.S. PATENT DOCUMENTS 2,163,108 A 6/1939 Smith
2,604,940 A 7/1952 Heptinstall
(Continued)

FOREIGN PATENT DOCUMENTS

EP 1 457 103 A1 9/2004
WO WO 2018/026915 A1 2/2018

OTHER PUBLICATIONS

U.S. Appl. No. 62/275,873, filed Jan. 7, 2016, Exmark Manf. Co., Inc.
(Continued)

*Primary Examiner* — Ryan Rink
(74) *Attorney, Agent, or Firm* — Mueting Raasch Group

(57) ABSTRACT

A control system for use with a turf maintenance vehicle. In one embodiment, the control system may provide a discrete engine speed input that may provide one engine speed command upon actuation, but result in additional engine speed commands depending on an actuation time of the input. In other embodiments, the vehicle may include an electronic controller (EC) providing resettable property statistics for one or more properties. In still another embodiment, the EC may provide a maintenance monitor onboard the vehicle that indicates maintenance status, when maintenance tasks are due or past due, and permanently records historical information regarding maintenance tasks. The maintenance monitor may further adjust a maintenance interval before the maintenance task is again due based upon inputs to the maintenance monitor.

16 Claims, 11 Drawing Sheets

Related U.S. Application Data continuation of application No. 15/392,282, filed on Dec. 28, 2016, now Pat. No. 10,701,859.

(60) Provisional application No. 62/275,873, filed on Jan. 7, 2016.

(51) Int. Cl.
*G07C 5/00* (2006.01)
*A01D 101/00* (2006.01)

(56) References Cited

U.S. PATENT DOCUMENTS

| | | | |
|---|---|---|---|
| 4,159,531 A | 6/1979 | McGrath | |
| 4,255,629 A | 3/1981 | Bell | |
| 4,404,641 A | 9/1983 | Bazarnik | |
| 4,539,632 A | 9/1985 | Hansen et al. | |
| 4,612,623 A | 9/1986 | Bazarnik | |
| 4,613,939 A | 9/1986 | Paine | |
| 4,656,973 A | 4/1987 | Endres | |
| 4,694,793 A | 9/1987 | Kawakita et al. | |
| 4,853,856 A | 8/1989 | Hanway | |
| 4,855,971 A | 8/1989 | Meisner et al. | |
| 5,046,007 A | 9/1991 | McCrery et al. | |
| 5,094,332 A | 3/1992 | Wall | |
| 5,303,163 A * | 4/1994 | Ebaugh | G07C 5/085 701/34.2 |
| 5,394,678 A | 3/1995 | Lonn et al. | |
| 5,497,604 A | 3/1996 | Lonn | |
| 5,558,062 A | 9/1996 | De Minco et al. | |
| 5,562,173 A | 10/1996 | Olson | |
| 5,642,284 A | 6/1997 | Parupalli et al. | |
| 5,644,491 A | 7/1997 | Fiske et al. | |
| 5,657,224 A | 8/1997 | Lonn et al. | |
| 5,679,085 A | 10/1997 | Fredriksen et al. | |
| 5,743,347 A | 4/1998 | Gingerich | |
| 5,857,159 A | 1/1999 | Dickrell et al. | |
| 5,969,601 A | 10/1999 | Sato et al. | |
| 6,038,917 A | 3/2000 | Sember | |
| 6,055,470 A | 4/2000 | Londot et al. | |
| 6,082,084 A | 7/2000 | Reimers et al. | |
| 6,109,986 A | 8/2000 | Gaynor et al. | |
| 6,202,629 B1 | 3/2001 | Zhu et al. | |
| 6,517,465 B2 | 2/2003 | Hrazdera | |
| 6,609,357 B1 | 8/2003 | Davis et al. | |
| 6,668,530 B2 | 12/2003 | Kern et al. | |
| 6,762,572 B1 * | 7/2004 | Ishii | B60L 3/00 323/282 |
| 6,819,988 B2 | 11/2004 | Dietz et al. | |
| 6,892,517 B2 | 5/2005 | Adams et al. | |
| 6,962,138 B2 | 11/2005 | Garrick et al. | |
| 7,034,674 B2 | 4/2006 | Harvey | |
| 7,076,348 B2 | 7/2006 | Bucher et al. | |
| 7,175,490 B2 | 2/2007 | Kanno et al. | |
| 7,356,393 B1 | 4/2008 | Schlatre et al. | |
| 7,588,514 B2 | 9/2009 | McKenzie et al. | |
| 7,666,117 B2 | 2/2010 | Kawakami et al. | |
| 7,669,393 B2 | 3/2010 | Park et al. | |
| 7,669,580 B2 | 3/2010 | Silbernagel et al. | |
| 7,744,503 B2 | 6/2010 | Kobayashi et al. | |
| 7,746,619 B2 | 6/2010 | Harnett et al. | |
| 7,774,130 B2 | 8/2010 | Pepper | |
| 8,056,695 B2 | 11/2011 | Silbernagel | |
| 8,080,905 B2 | 12/2011 | Straka | |
| 8,160,804 B2 | 4/2012 | Chominsky et al. | |
| 8,175,790 B2 | 5/2012 | Stemler et al. | |
| 8,320,096 B2 | 11/2012 | Harnett | |
| 8,340,925 B2 | 12/2012 | Higgins et al. | |
| 8,403,102 B2 | 3/2013 | Raasch | |
| 8,739,751 B2 | 6/2014 | Stoffels et al. | |
| 9,002,585 B2 | 4/2015 | Porter et al. | |
| 9,462,746 B1 | 10/2016 | Gerhardson et al. | |
| 10,468,062 B1 | 11/2019 | Levinson et al. | |
| 10,701,859 B2 | 7/2020 | Bryant et al. | |
| 10,902,687 B2 | 1/2021 | Mehta et al. | |
| 2002/0198997 A1 | 12/2002 | Linthicum et al. | |
| 2003/0113096 A1 | 6/2003 | Taira et al. | |
| 2004/0230346 A1 * | 11/2004 | Brooks | B60K 25/06 701/1 |
| 2005/0053447 A1 * | 3/2005 | Bucher | E01C 19/004 411/470 |
| 2005/0231380 A1 * | 10/2005 | Kamiya | B60R 16/0231 340/691.6 |
| 2007/0221168 A1 | 9/2007 | Katrak et al. | |
| 2007/0294017 A1 | 12/2007 | Joshi et al. | |
| 2008/0178839 A1 | 7/2008 | Oshima et al. | |
| 2009/0005927 A1 | 1/2009 | Schlatre et al. | |
| 2009/0188224 A1 | 7/2009 | Assie et al. | |
| 2010/0033890 A1 | 2/2010 | Harnett | |
| 2010/0192907 A1 | 8/2010 | Stemler et al. | |
| 2012/0053778 A1 | 3/2012 | Colvin et al. | |
| 2012/0235921 A1 | 9/2012 | Laubach | |
| 2012/0290151 A1 * | 11/2012 | Bissontz | B60W 10/30 180/65.265 |
| 2013/0110363 A1 | 5/2013 | Ries et al. | |
| 2014/0083392 A1 | 3/2014 | Cattani et al. | |
| 2014/0266664 A1 | 9/2014 | Dwyer | |
| 2015/0075490 A1 | 3/2015 | Hull et al. | |
| 2015/0196179 A1 | 7/2015 | Kinkead et al. | |
| 2015/0338386 A1 | 11/2015 | Chapman, III | |
| 2016/0016588 A1 | 1/2016 | Serini et al. | |
| 2016/0355183 A1 | 12/2016 | Nakade | |
| 2017/0349058 A1 | 12/2017 | Bernier et al. | |
| 2020/0281115 A1 | 9/2020 | Bryant | |

OTHER PUBLICATIONS

"How does Dash calculate fuel efficiency" Web page [online]. [retrieved on Sep. 21, 2017]. Retrieved from the Internet: <URL: http://web.archive.org/web/20150707161042/a.http://support.dash.by/hc/en-us/articles/204630530-How-does-Dash-calculate-fuel-efficiency->. Jul. 7, 2015; 1 page.

KOHLER "KOHLER Command PRO, ECV940 & ECV980" Service Manual. Kohler Engines, Copyright 2015; 108 pages.

"Screen Design Map" poster presentation at Exmark Distributor Meeting, Aug. 19, 2014, at Exmark's facility in Beatrice, NE; 5 pages.

"SenDEC Soft Start Controller for Electric Clutches," SenDec, Fairport, NY, Updated Jan. 28, 2011; 2 pgs.

"Toyota Tacoma 2014, Navigation System Owner's Manual," Selected pages. Toyota Motor Corp.; Copyright 2013, 15 pages.

Stackoverflow, https://stackoverflow.com/questions/8235745/change-a-value-smoothly-increasing-in-speed-by-holding-down-a-button (Year: 2011); 4 pages.

JWin, instruction manual for JL-206 Alarm clock, jWIN Electronics Corp. (Year: 2008); 12 pages.

* cited by examiner

ELECTRONIC CONTROLLER AND TURF MAINTENANCE VEHICLE INCORPORATING SAME

This application is a continuation of U.S. patent application Ser. No. 16/884,688, filed May 27, 2020, which is a continuation application of U.S. patent application Ser. No. 15/392,282, filed Dec. 28, 2016, which claims the benefit of U.S. Provisional Application No. 62/275,873, filed Jan. 7, 2016, all of which are incorporated herein by reference in their entireties.

Embodiments of the present disclosure relate generally to turf maintenance vehicles and, more particularly, to an electronic controller operable to both control various vehicle subsystems based upon received inputs, and/or monitor and record vehicle operating and maintenance information.

BACKGROUND

Turf maintenance vehicles such as lawn mowers, aerators, and spreader/sprayers are used by consumers and professional alike. These vehicles are typically configured as walk-behind or ride-on vehicles having an attached implement such as a grass cutting deck. Within the deck, cutting blades rotate at a speed sufficient to cut vegetation over which the deck passes during operation. The deck (e.g., cutting blades) may be powered by the engine via an implement drive system. A power take-off (PTO) is provided to allow the implement drive system to selectively engage with, and disengage from, the engine. That is, when the PTO is engaged, the engine may effectively power the implement drive system.

Turf maintenance vehicles are known to use an electronic controller to monitor various engine and vehicle parameters. For example, the controller may monitor operator input regarding engine speed, and output commands to an electronic governor of the engine in response thereto. Such a speed control system is disclosed in, for example, U.S. Pat. No. 9,002,585.

To assist with maintenance, some vehicles also provide service indicators or reminders. Such reminders are usually presented based upon the expiration of a predetermined, fixed period of engine operation (the maintenance interval). These reminders may be presented to the operator when the maintenance task (e.g., engine oil change) is due and, once the task is completed, the reminder may be reset. The reminder is provided again at the expiration of subsequent maintenance intervals. Other reminders are not resettable and merely trigger at fixed intervals (e.g., every 100 hours).

Still further, professional landscape contractors may work on multiple properties during a given day. In order to recover costs associated with each job, the operator may monitor engine and/or machine operation time, e.g. via an hour meter, for the duration of each job and record the same to a log. While effective, engine run time may not always reflect actual job cost. Moreover, the operator may not always remember to log hour meter readings between jobs.

SUMMARY

Embodiments described herein may provide a turf maintenance vehicle controller, and associated methods, that may simplify vehicle operation and maintenance.

For example, in one embodiment, a turf maintenance vehicle is provided that includes a chassis supported upon a ground surface by a plurality of ground-engaging members; a prime mover supported by the chassis, the prime mover having a drive shaft and an engine speed regulator; and an electronic controller (EC) in communication with the engine speed regulator. Also included is a prime mover speed selection switch in communication with the EC, wherein: actuation of the prime mover speed selection switch for a period of time less than a predetermined first threshold period causes the EC to command a speed of the prime mover to a first preset speed; actuation of the prime mover speed selection switch for a period of time equal to or greater than the first threshold period causes the EC to command the speed of the prime mover to a second preset speed different than the first preset speed; and actuation of the prime mover speed selection switch for a period of time equal to or greater than a predetermined second threshold period, the second threshold period being greater than the first threshold period, causes the EC to command the speed of the prime mover to a third preset speed different than the first and second preset speeds.

In another embodiment, a method for controlling a turf maintenance vehicle is provided, wherein the method includes: actuating an engine speed selection switch from an off state to an on state; measuring an actuation time that the switch remains in the on state; and communicating the actuation time to an electronic controller (EC), the EC in communication with an engine of the vehicle. The method further includes: comparing, with the EC, the actuation time to a predetermined step interval; determining a number of expired step intervals occurring within the actuation time; and changing an engine speed command generated by the EC by a predetermined increment for each expired step interval.

In yet another embodiment, a method for controlling a turf maintenance vehicle is provided, wherein the method includes: actuating an engine speed selection switch from an off state to an on state; communicating a signal to an electronic controller (EC) indicating that the engine speed selection switch is in the on state, the EC in communication with an engine of the vehicle; and generating a first engine speed command with the EC. The method further includes: measuring an actuation time that the engine speed selection switch remains in the on state; communicating the actuation time to the EC; comparing, with the EC, the actuation time to a predetermined step interval; and generating, with the EC, a revised engine speed command each time the actuation time exceeds a multiple of the step interval.

In still another embodiment, a turf maintenance vehicle is provided that includes: a chassis supported upon a ground surface by a plurality of ground-engaging members; and a prime mover supported by the chassis. The vehicle further includes an implement connected to the chassis, the implement operatively connected to the prime mover when a power take-off (PTO) is engaged, and operatively disconnected from the prime mover when the PTO is disengaged, wherein the implement is adapted to perform a maintenance task. An electronic controller (EC) is provided and carried on the chassis. The EC includes a system memory and a property memory, wherein the system memory and the property memory each include a first storage portion adapted to record an accumulated time during which the PTO has been engaged. The property memory is resettable such that the first storage portion of the property memory is reset to a zero value, while the system memory is non-resettable.

In still yet another embodiment, a method of operating a turf maintenance vehicle is provided, wherein the method includes: operating a prime mover attached to the vehicle, the vehicle carrying an implement; detecting whether a power take-off (PTO) associated with the prime mover is engaged or disengaged, wherein the PTO operatively connects the implement to the prime mover when the PTO is engaged, and operatively disconnects the implement from the prime mover when the PTO is disengaged; recording an accumulated time that the PTO is engaged to both a system memory and a property memory; and selectively erasing contents of the property memory while preserving contents of the system memory.

In still another embodiment, a method of operating a turf maintenance vehicle is provided, wherein the method includes: detecting when an engine of the vehicle is running, the vehicle carrying an implement that receives power from the engine only when a power take-off (PTO) associated with the engine is engaged; recording an accumulated run time of the engine to both a system memory and a property memory; detecting whether the PTO is engaged; recording an accumulated time that the PTO has been engaged to both the system memory and the property memory; and selectively erasing contents of the property memory while preserving contents of the system memory.

In yet another embodiment, a method of operating a turf maintenance vehicle is provided that includes: determining an accumulated volume of fuel used by an engine of the vehicle; recording the accumulated volume of fuel used by the engine to both a system memory and a property memory; and selectively erasing contents of the property memory while preserving contents of the system memory.

In still yet another embodiment, a turf maintenance vehicle is provided that includes: a chassis supported upon a ground surface by ground-engaging members; a prime mover supported by the chassis; and an implement also connected to the chassis, the implement operatively connected to the prime mover when a power take-off (PTO) is engaged, and operatively disconnected from the prime mover when the PTO is disengaged. The vehicle also includes an electronic controller (EC) carried on the chassis, the EC having a system memory adapted to record one or both of: an accumulated run time of the prime mover; and an accumulated time that the PTO has been engaged. A maintenance monitor is also carried by the chassis and is in communication with the EC, the maintenance monitor including an interactive display (ID) adapted to indicate a status of a maintenance interval, the maintenance interval corresponding to performance of a maintenance task, wherein the maintenance interval is either: an elapsed run time of the prime mover since the maintenance task was last performed; or a time that the PTO has been engaged since the maintenance task was last performed. Also provided with the maintenance monitor is a first input associated with the ID and adapted to receive operator input indicating that the maintenance task is complete, wherein, after receiving the operator input, the maintenance interval is reset to either: a first duration; or a second duration different than the first duration. A maintenance memory is provided to permanently store, at the time the maintenance task was completed, a record of: completion of the maintenance task; and either: the accumulated run time of the prime mover; or the accumulated time that the PTO has been engaged. A second input associated with the ID is adapted to receive one of either a first or second maintenance input corresponding to a first or second parameter of the maintenance task, respectively, wherein the first maintenance input results in the maintenance monitor setting the maintenance interval to the first duration, and the second maintenance input results in the maintenance monitor setting the maintenance interval to the second duration.

In another embodiment, a method of monitoring maintenance tasks for a turf maintenance vehicle is provided, wherein the method includes: recording, with an onboard electronic controller (EC), an accumulated engagement time of a PTO associated with a prime mover of the vehicle, wherein the accumulated engagement time corresponds to a total time that the PTO has been engaged for operation; and indicating, with an onboard maintenance monitor, that a maintenance task is due, the maintenance monitor in communication with the EC. The method further includes providing an operator input to the maintenance monitor, wherein the operator input indicates completion of the maintenance task. The method further includes providing a first or second maintenance input to the maintenance monitor corresponding to a first or second selection associated with the maintenance task, respectively, wherein, upon receiving the operator input and either the first or second maintenance input, the maintenance monitor establishes a maintenance interval, the maintenance interval corresponding to an elapsed engagement time of the PTO to occur before the maintenance task is again due, and wherein the maintenance interval is set to: a first duration upon providing the first maintenance input; or a second duration, different than the first duration, upon providing the second maintenance input. The method also includes electronically storing an onboard, permanent record of: completion of the maintenance task; and the accumulated engagement time of the PTO at the time the operator input was received indicating completion of the maintenance task.

In still another embodiment, a method of monitoring maintenance tasks for a turf maintenance vehicle is provided, wherein the method includes: recording, with an onboard electronic controller (EC), an accumulated run time of a prime mover of the vehicle, the accumulated run time corresponding to a total time that the prime mover has been operating; and indicating, with an onboard maintenance monitor, that a maintenance task is due, the maintenance monitor in communication with the EC. The method further includes: providing an operator input to the maintenance monitor, the operator input indicating completion of the maintenance task; and providing a first or second maintenance input to the maintenance monitor corresponding to a first or second selection associated with the maintenance task, respectively. Upon receiving the operator input and either the first or second maintenance input, the maintenance monitor establishes a maintenance interval, the maintenance interval corresponding to a run time of the prime mover to elapse before the maintenance task is again due, and wherein the maintenance interval is set to: a first duration upon providing the first maintenance input; or a second duration, different than the first duration, upon providing the second maintenance input. The method also includes electronically storing an onboard, permanent record of: completion of the maintenance task; and the accumulated run time of the prime mover at the time the operator input was received indicating completion of the maintenance task.

In still another embodiment, a method of monitoring maintenance tasks for a turf maintenance vehicle is provided, wherein the method includes: recording, with an onboard electronic controller (EC), an accumulated run time of an engine powering the vehicle, the accumulated run time corresponding to a total time that the engine has been operating, the EC comprising a maintenance monitor; monitoring the accumulated run time of the engine with the maintenance monitor; and indicating, on a display screen in communication with the maintenance monitor, that a maintenance task is due. The method also includes providing an operator input to the maintenance monitor, the operator input indicating completion of the maintenance task; providing a first or second maintenance input to the maintenance monitor corresponding to a first or second selection associated with the maintenance task, respectively, wherein, upon receiving the operator input and either the first or second maintenance input, the maintenance monitor establishes a maintenance interval, the maintenance interval corresponding to a run time of the engine to elapse before the maintenance task is again due. The maintenance interval may be set to: a first duration upon providing the first maintenance input; or a second duration, different than the first duration, upon providing the second maintenance input. The method also includes electronically storing an onboard, permanent record of: completion of the maintenance task; and the accumulated run time of the engine at the time the operator input was received indicating completion of the maintenance task.

A more complete understanding of illustrative embodiments will become apparent and appreciated by reference to the following Detailed Description of Exemplary Embodiments and Claims in view of the accompanying figures of the drawing.

BRIEF DESCRIPTION OF THE VIEWS OF THE DRAWING

Exemplary embodiments will be further described with reference to the figures of the drawing, wherein:

FIGS. 8-10 illustrate exemplary property statistics screens displayed on the ID in accordance with embodiments of the present disclosure, wherein: FIG. 8 shows the screen in a pause mode after accumulating property statistics;

FIG. 9 illustrates a screen presented after the property statistics are reset; and FIG. 10 illustrates a screen presented as property statistics are being recorded;

FIGS. 11-13 illustrate exemplary screens displayed on the ID when a maintenance monitor of the EC is interrogated, wherein: FIG. 11 shows a status display screen indicating hours of operation remaining until a particular maintenance task (e.g., transmission oil change) should be performed; and FIG. 12 shows the same status display screen after a maintenance period has expired and is past due; and FIG. 13 shows a history of prior occurrences of the exemplary maintenance task;

FIGS. 14-16 illustrate exemplary screens presented by the ID regarding performance of a maintenance task (e.g., engine oil change), wherein: FIG. 14 shows a status display screen indicating hours of operation remaining until the maintenance task should be performed;

FIG. 15 shows a confirmation screen presented when resetting the maintenance interval; and FIG. 16 shows a selection screen, the input of which is used to determine the next maintenance interval based upon oil type.

Figure 1:
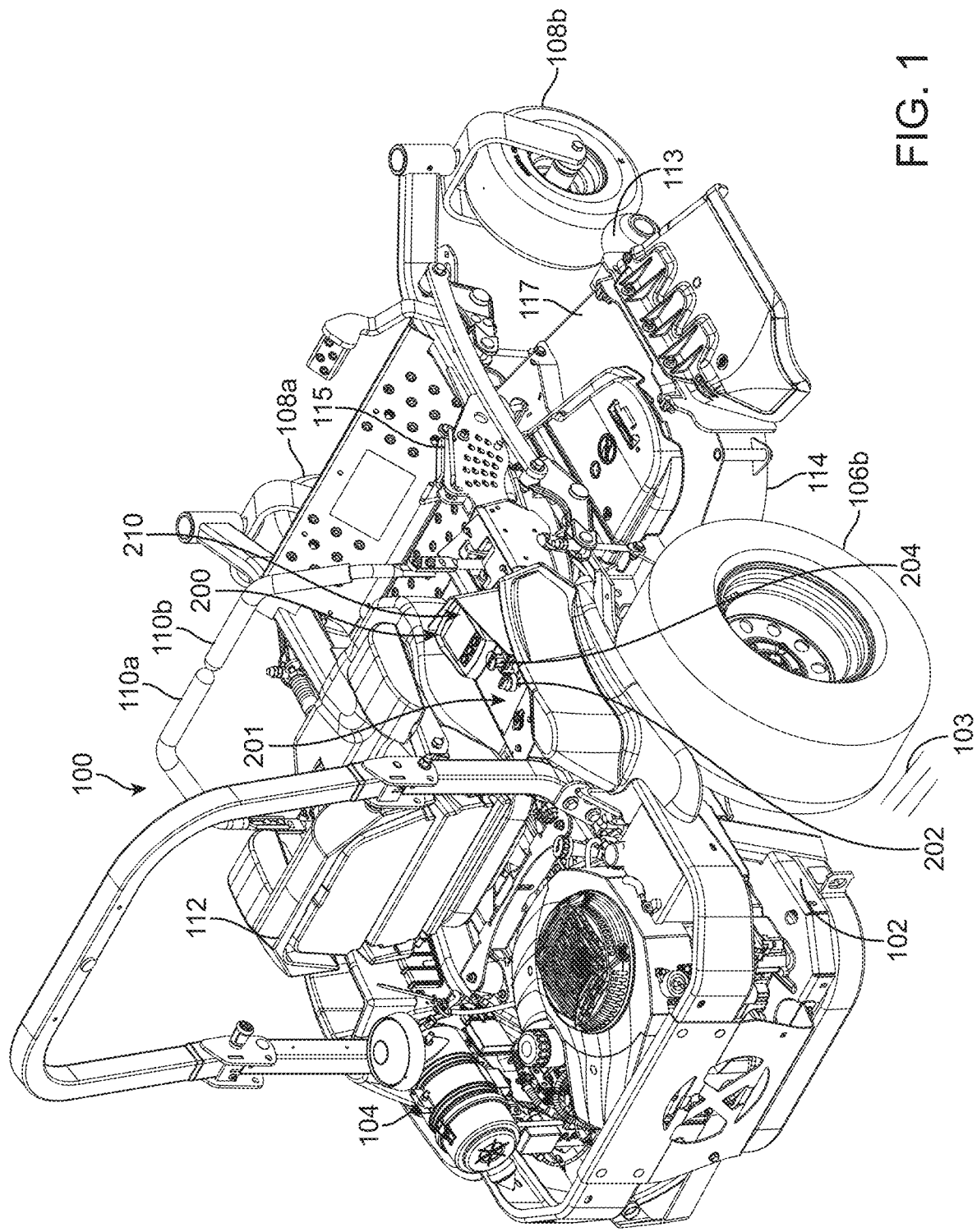
FIG. 1 illustrates a turf maintenance vehicle (e.g., a riding lawn mower) having a control system incorporating an electronic controller (EC) in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings and subheadings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Generally speaking, embodiments of the present disclosure may be directed to control systems for controlling various aspects of a power turf maintenance vehicle and, optionally, an attached or otherwise carried implement (e.g., a riding lawn mower). The control system may include an electronic controller (EC) adapted to control, based on detected operator inputs and sensed vehicle parameters, various functions of the vehicle and/or provide various information (e.g., maintenance data, property statistics) to an operator or technician through an interactive display (ID) in communication with the EC.

For example, the vehicle may include controls adapted to receive operator inputs that set an engine speed of the vehicle to any one of a plurality of discrete engine speeds (e.g., low engine speed, medium (e.g., efficient) engine speed, and maximum engine speed). The inputs may be received by the EC, which then, based on one or more monitored parameters, outputs a discrete command to an engine speed regulator, e.g., to an electronic governor or an electronic throttle actuator, adapted to control the engine speed. In some embodiments, one or more of the engine speed controls may be manipulated to provide a plurality of engine speed commands in addition to its primary command. For example, actuation of the low engine speed selection input for a period of time less than a predetermined threshold period may cause the EC to command the engine speed to a first preset speed. However, actuation of the low engine speed selection input for a period of time equal to or greater than the threshold period may cause the EC to command the engine speed to a second preset speed different (e.g., lower) than the first preset speed. In some embodiments, continued actuation of the low speed selection switch may cause the engine speed to step downwardly (e.g., in fixed increments) in proportion to the actuation time of the input until a minimum predetermined speed threshold is reached.

In other embodiments, the EC may include a first (e.g., system) memory and a second (e.g., property) memory. The system memory and the property memory may each include: a first storage portion adapted to record an accumulated time that a power take-off (PTO) has been engaged (wherein the EC is able to detect whether the PTO is engaged or disengaged); and, optionally, a second storage portion adapted to record an accumulated run time of the prime mover (which the EC is also able to detect/monitor). The property memory may be resettable such that the storage portions associated with the property memory are reset to a zero value, while the system memory is non-resettable. In addition to engine run time and PTO engaged time, at least the property memory may also track a volume of fuel (e.g., gasoline) used, e.g., since the property memory was last reset. Such a configuration may allow the operator of the vehicle to accurately track engine run time (as well as PTO engagement time and, optionally, fuel used) for a particular property. Moreover, in some embodiments, additional (and resettable) property memories may be included to allow the EC to store operating statistics for a plurality of properties.

While described herein as recording engine and PTO run time and fuel used, such a configuration is exemplary only. Other embodiments, may store other statistics to the system memory and/or the property memory. For example, engine and vehicle errors, fuel economy, maintenance information, and other vehicle information may be stored in the system memory (not-resettable), and/or in the property memory (resettable).

In still other embodiments, the EC may incorporate a maintenance monitor operable to track when one or more maintenance tasks is due (e.g., based upon elapsed run time of the engine or PTO engaged time). Upon completion of the maintenance task, the monitoring system may then permanently store, onboard the vehicle, information regarding: when the maintenance task was completed; and the accumulated run time of the engine (and/or accumulated PTO engagement time) at the time the maintenance task was completed. Moreover, the maintenance monitor may allow adjustment of future maintenance intervals based upon operator inputs regarding the maintenance task.

With reference to the figures of the drawing, wherein like reference numerals designate like parts and assemblies throughout the several views, FIG. 1 illustrates a turf maintenance vehicle in accordance with one exemplary embodiment of the present disclosure. While shown in this view as a self-propelled, turf maintenance vehicle, e.g., a zero-turning-radius riding lawn mower 100 (also referred to herein simply as a "vehicle" or "mower"), such a configuration is not limiting. That is, while embodiments are described herein with respect to a riding mower, those of skill in the art will realize that this disclosure is equally applicable to other types of mowers, as well as to other types of turf maintenance vehicles (e.g., aerators, spreader/sprayers, dethatchers, debris management systems (e.g., blowers, vacuums, sweeper, etc.), general purpose utility vehicles, and the like) without limitation.

It is noted that the term "comprises" (and variations thereof) does not have a limiting meaning where this terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the other part/feature (e.g., part/feature identified with a "b" suffix). Similarly, the description of a part/feature identified with no suffix may apply, unless noted otherwise, to both the corresponding left and right part/feature.

As shown in FIG. 1, the mower 100 may include a frame or chassis 102 that supports a prime mover. While the prime mover may be configured as most any source of power (e.g., an electric motor), it is, in the embodiment shown, configured as an internal combustion engine 104. The chassis 102 may be supported upon the ground surface 103 by ground-engaging members that, in one embodiment, include left and right ground-engaging drive wheels 106 that may be coupled to left and right sides of a rear portion of the mower 100 (e.g., only right drive wheel 106b visible, but left drive wheel is generally a mirror image). The drive wheels 106 may be independently powered by the engine (e.g., via one or more hydraulic motors, transmissions, transaxles, or the equivalent) so that the drive wheels 106 may rotate (relative to the chassis) and selectively propel the mower 100 over the ground surface 103. While a single prime mover (e.g., engine 104) may power both the vehicle wheels and the implement (cutting deck), other embodiments may utilize two or more prime movers (e.g., different prime movers for propulsion and for implement power) without departing from the scope of this disclosure.

One or more controls, e.g., left and right drive control levers 110 (left lever 110a, right lever 110b) may also be provided. The drive control levers 110 are pivotally coupled to the mower such that they may pivot forwardly and rearwardly under the control of an operator sitting in an operator's seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the disclosure. In the illustrated embodiment, a pair of front swiveling ground-engaging members (e.g., caster wheels 108*a*, 108*b*) may support a front portion of the mower 100 in rolling engagement with the ground surface 103. Of course, other drive configurations (e.g., actively steered front and/or rear wheels, tri-wheel configurations) and vehicles using ground-engaging members other than wheels (e.g., tracks), are certainly contemplated within the scope of this disclosure.

An implement adapted to perform a maintenance task, e.g., a lawn mower cutting deck 114, may be connected to, or otherwise carried by, the chassis 102 of the mower 100, e.g., generally between the drive wheels 106 and the caster wheels 108. The cutting deck 114 may include a deck housing 117 that partially defines an enclosure forming a downwardly-opening cutting chamber (not shown). The cutting chamber may partially surround one or more rotatable cutting blades (also not shown), each attached to a blade spindle assembly as is known in the art. Of course, other cutting decks (e.g., out-front decks, towed decks, reel units, etc.), as well as other implements, are contemplated within the scope of this disclosure.

During operation, power is selectively delivered to the cutting deck 114 (e.g., to the spindle assemblies) and the drive wheels 106, whereby the cutting blades rotate at a speed sufficient to sever grass and other vegetation as the deck passes over the ground surface 103. Typically, the cutting deck 114 includes an operator-selectable height-of-cut control system 115 to allow deck height adjustment relative to the ground surface 103. The cutting deck 114 may optionally include anti-scalp rollers 113 as shown in FIG. 1 to assist in reducing blade/ground contact.

With this general overview, an embodiment of an exemplary control system 200 will now be described. As shown in FIG. 1, the control system 200 may include a control area or panel 201, an exemplary embodiment of which is illustrated in more detail in FIG. 2. The control panel 201 may be positioned on the mower at a location that is conveniently accessible to the operator while sitting in the operator's seat 112 (see FIG. 1). While not wishing to be bound to any specific configuration, the control panel 201 may include operator-selectable controls (e.g., switches) configured to provide inputs to the control system 200, an embodiment of which is shown schematically in FIG. 3. For example, the control panel 201 may include a key/ignition switch 202 (not shown in FIG. 3) for starting the engine 104 or otherwise activating the vehicle's electrical system. Moreover, the control panel may include a display screen 212 associated with an interactive display (ID) 210. The ID may present vehicle information including, but not limited to, accumulated engine run time (hour meter), engine temperature, engine RPM, fuel level, and interlock (e.g., PTO (clutch) mechanism, park brake, etc.) status.

In the illustrated embodiment, the control panel 201 may also include a user-selectable PTO engagement switch 204. The exemplary PTO engagement switch 204 may be configured as a two-setting (e.g., push-pull between off and on states) mechanical switch. While the PTO engagement switch 204 (as well as other switches described herein) is described and illustrated herein as a mechanical switch that physically moves between its different switch positions, the term "switch," as used herein, is understood to encompass most any device that may allow actuation of a device or system or otherwise selectively allow a change in setting of the device or system. For example, switches as described herein may be non-movable switches such as contact switches and optical switches. In still other embodiments, "switch" may refer to other types of moving or non-moving actuation devices including, for example, touch screen elements, pressure-sensitive elements, and the like. As a result, the term "position" (as used herein with respect to a switch), is understood to encompass any distinct manipulation or output provided by a non-movable switch. Moreover, the term "movable" and its variations (as again used herein to describe aspects of a switch), are understood to include any manipulation of the switch that results in altering the switch's setting or output, regardless of whether this manipulation is accompanied by actual physical movement of the switch.

The control panel 201 may further include the ID 210. The ID 210 may form an interface for interacting with the EC (which is indicated by reference numeral 220 in FIG. 3) and various vehicle systems. In addition to the screen 212, the ID also includes, in one embodiment, one or more (e.g., three) discrete inputs or input elements that allow operator selection/interaction with the information presented on the screen 212. In some embodiments, the inputs are configured as three physical, push-button switches 214, 216, and 218 whose particular function changes in correspondence with information presented on the screen 212. However, as indicated above, the input elements could take most any form (e.g., touch screen elements or other types of mechanical, optical, or contact switches) without departing from the scope of this disclosure. While illustrated herein as two separate components, the EC and ID may be constructed as one integral module.

As further described below, the system 200 (e.g., the EC 220) may monitor various functions and processes regarding vehicle operation. For example, the EC may monitor vehicle parameters via one or more sensors 223 (see FIG. 3). These sensor(s) 223 may include (but are not limited to): a clutch current sensor; a voltage sensor; an engine and/or transmission temperature sensor; an engine oil pressure sensor, an operator presence sensor (e.g., seat switch); a drive lever 110 position (e.g., neutral) sensor; a ground speed sensor, parking brake position sensor, etc. The signals from these sensors 223 may be utilized as inputs to other vehicle functions, e.g., they may operate as interlocks that must be satisfied before various mower operations begin.

Figure 3:
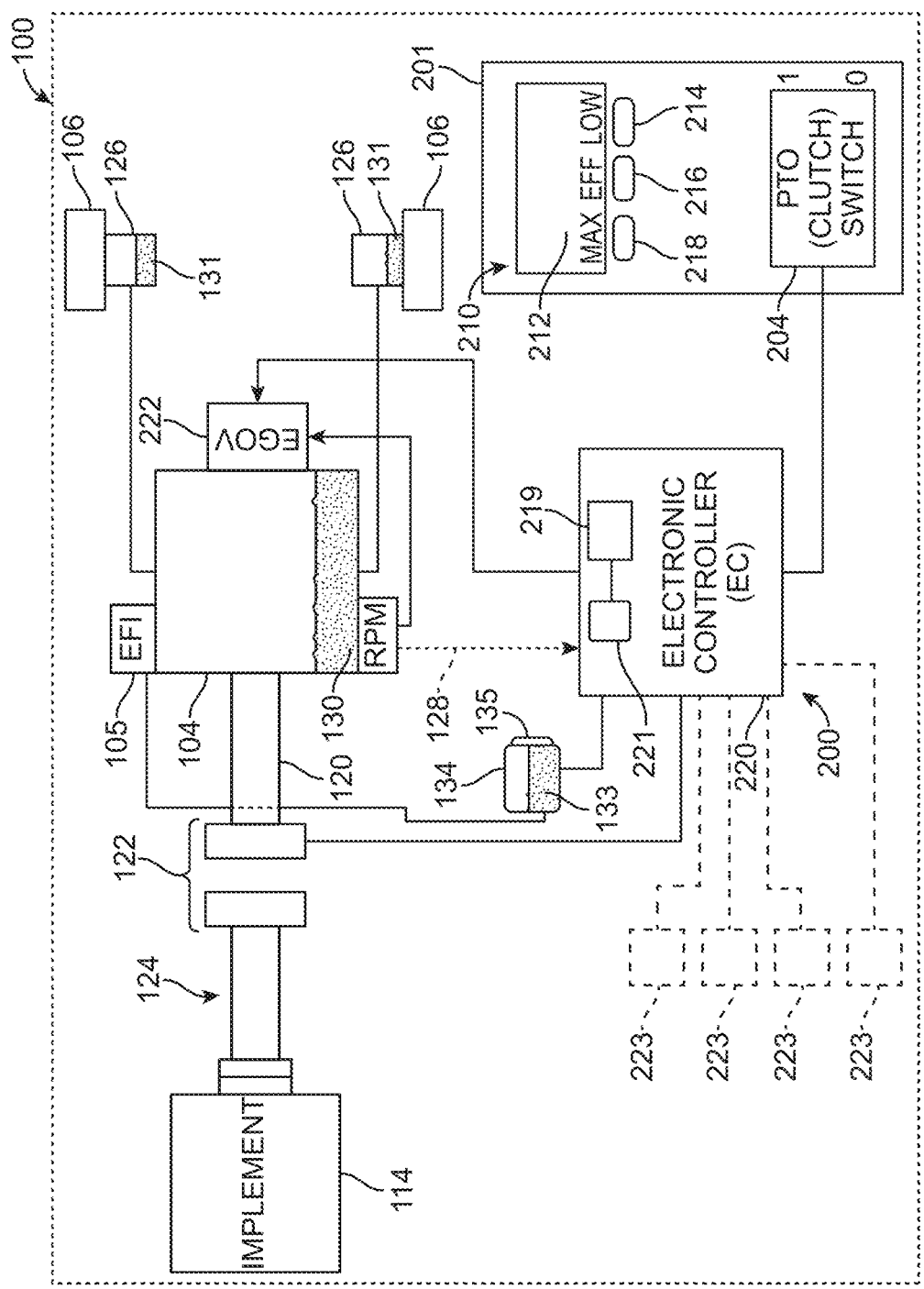
FIG. 3 is a schematic view of the control system in accordance with one embodiment of the disclosure.

As shown in FIG. 3, the EC 220, which may be carried on the chassis 102, may include a processor 221, memory 219, and other components necessary or beneficial to EC operation. The memory 219 may include computer-readable instructions that, when executed, e.g., by the processor 221, cause the EC 220 to perform various functions. The memory 219 may include any volatile, non-volatile, magnetic, optical, and/or electrical media, such as a random access memory (RAM), read-only memory (ROM), non-volatile RAM (NVRAM), electrically-erasable programmable ROM (EEPROM), flash memory, and/or any other digital media. While shown as both being incorporated into the EC 220, the memory and the processor could be contained in separate modules. Moreover, the EC 220 could be combined with an engine-specific control module so that all electronic functions of the vehicle and engine are combined into one component.

The processor 221 of the EC 220 may include any one or more of a microprocessor, a controller, a digital signal processor (DSP), an application specific integrated circuit (ASIC), a field-programmable gate array (FPGA), and/or equivalent discrete or integrated logic circuitry. In some examples, the processor 221 may include multiple components, such as any combination of one or more microprocessors, one or more controllers, one or more DSPs, one or more ASICs, and/or one or more FPGAs, as well as other discrete or integrated logic circuitry. The functions attributed to the EC 220/processor 221 herein may be embodied as software, firmware, hardware, or any combination thereof. While described herein as a processor-based system, an alternative EC could utilize other components such as relays and timers to achieve the desired results, either alone or in combination with a microprocessor-based system.

In one or more embodiments, the exemplary systems, methods, and interfaces (e.g., the maintenance monitor described herein) may be implemented using one or more computer programs using a computing apparatus such as the processor 221 and memory 219. Program code and/or logic described herein may be applied to input data to perform functionality described herein and generate desired output information. The output information may be applied as an input to one or more other devices and/or methods as described herein or as would be applied in a known fashion. In view of the above, it will be readily apparent that the EC functionality as described herein may be implemented in any manner known to one skilled in the art.

As stated elsewhere herein, this description is organized by headings/subheadings for organizational purposes only. That is, the particular headings/subheadings are not intended to limit in any way the embodiments described therein, i.e., alternative embodiments may be found elsewhere in the specification. Accordingly, the specification is to be considered as a whole.

Engine Speed Control

Figure 2:
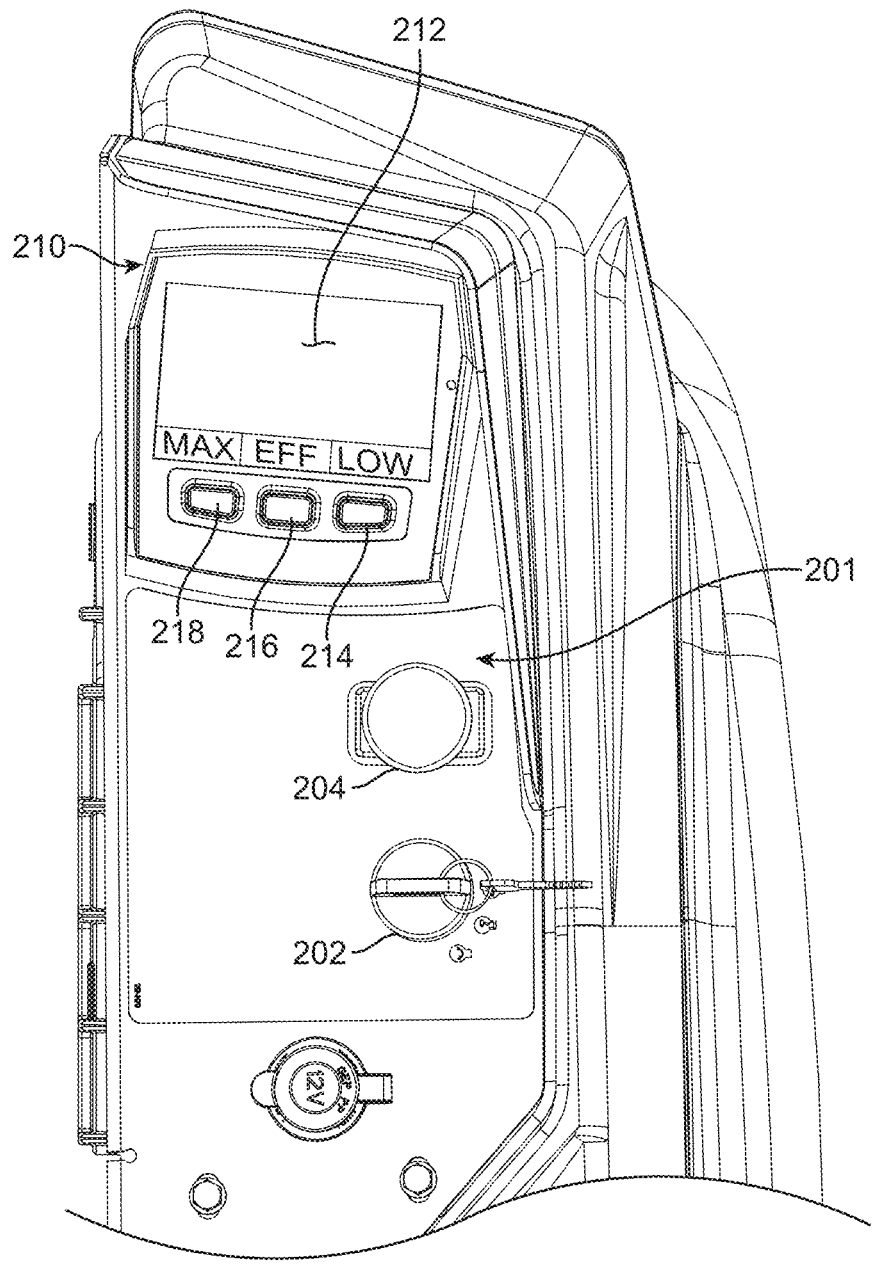
FIG. 2 is an enlarged partial view of a control area isolated from the remainder of the vehicle of FIG. 1, the control area illustrating an exemplary input/output (I/O) device in communication with the EC, the I/O device configured as an interactive display (ID)

As shown in FIG. 2, the switches 214, 216, and 218 may function (during typical mower operation) as separate engine speed command inputs (engine speed selection switches) that correspond, respectively, to three discrete engine speed settings. For example, the button 214 may correspond to a low engine speed setting, while the button 216 corresponds to an intermediate or "efficient" engine speed setting (greater than the low engine speed setting). Finally, the button 218 may correspond to a high engine speed setting (greater than the efficient engine speed setting). Of course, the engine speed command associated with each of these buttons may vary. For example, the function of the buttons 214 and 218 could be switched (e.g., buttons 214 and 218 could correspond to the high and low engine speed commands, respectively). Operation of these engine speed selection switches is further described below.

As one can appreciate, while the engine speed command inputs are described and illustrated herein as three distinct switches, such a configuration is not limiting. In fact, most any switch or combination of switches (or switch-like devices) capable of together providing multiple (e.g., two or more) discrete speed settings as described herein is possible without departing from the scope of this disclosure.

FIG. 3 is an exemplary, schematic diagram of portions of the control system 200 of the mower 100. As shown herein, the mower 100 may be configured as a zero-radius-turning mower driven by a wheel drive system having dual hydrostatic transmissions 126, each powered by the engine 104 (e.g., via one or more drive belts, not shown). Each transmission 126 may independently control the speed and direction of its respective drive wheel 106 based upon input provided by the operator, e.g., via the respective drive control levers 110 (see FIG. 1). Accordingly, the mower may be directed over the ground surface 103 in the desired direction and at the desired speed via the wheel drive system.

To selectively provide power to the cutting deck 114 (or other implement), the engine 104 may include an output or drive shaft 120 configured to operatively couple to, and decouple from, an implement drive system 124 under the control of an engagement mechanism (e.g., PTO 122). In one embodiment, the implement drive system 124 (which could be, e.g., a belt drive system or a shaft drive) may be connected to the implement (e.g., to the cutting deck 114) and selectively rotated by the engine 104 when the PTO 122 (disposed between the implement drive system and the drive shaft 120 of the engine) is engaged.

As used herein, the term "PTO" may include most any controlled engagement system including, for example, a conventional electro-magnetic clutch, a continuously variable transmission device, or any other equivalent power transmission system (including, e.g., wheel propulsion transmissions). In embodiments wherein the PTO is configured as a clutch, the PTO may be energized (e.g., the PTO may be engaged (placed into an engaged state) whereby it operatively connects the engine to the implement/implement drive system 124 to provide power to the latter) by an electric current provided to the clutch, producing a magnetic field that draws two opposing clutch components (see, e.g., FIG. 3) tightly together, effectively permitting transmission of torque through the clutch. To de-energize the PTO 122 (e.g., to disengage the clutch (place it into a disengaged state) whereby the engine is disconnected or de-coupled from the implement/implement drive system), the electric current is terminated. Once the current is terminated, the clutch components may separate, mechanically disconnecting the implement drive system 124 from the drive shaft 120.

While illustrated as a clutch mechanism, the PTO may again include most any device/method that permits the transmission of power from the prime mover to an implement or subsystem associated with the vehicle. For example, a turf vehicle in accordance with embodiments of the present disclosure may be configured as a spreader/sprayer having one or more electric motors as a power source that powers a spray pump and/or broadcast spinner. In such a vehicle, the "PTO" may simply be a switch that provides power from the electric motor to a pump associated with the spray system.

In the illustrated embodiment of FIG. 3, the engine 104 includes an electronic governor (EGOV) 222 and, optionally, an electronic fuel-injection (EFI) system 105, wherein the EGOV is capable of changing or otherwise regulating engine speed. As used herein, the term "electronic governor" or "EGOV" may include most any system operable to electrically control and/or regulate engine speed. Moreover, a system incorporating EGOV in accordance with embodiments of the present disclosure may be used with or without an EFI system. For example, EGOV can be used with a diesel engine and with a carbureted engine without issue. In some embodiments, an RPM feedback signal 128 may optionally be provided to the EC, e.g., for closed loop engine speed control.

As shown in FIG. 3, the control system 200 may include, among other components, the control panel 201 and its associated controls (e.g., switch 204, ID 210 (including switches 214, 216, and 218)), as well as the EC 220. The EC 220 is configured to receive electrical input signals from, among others, the switches 204, 214, 216, and 218. The EC 220 may then transmit, based upon pre-programmed logic, electrical command signals to the engine 104 (e.g., an engine speed command to the EGOV 222) as described herein, as well as to the PTO 122 (e.g., a PTO command). In one embodiment, the EC 220 may, upon operator actuation of one or more of the switches 214, 216, and 218, deliver to the engine speed regulator (e.g., to the governor): a first engine speed command when the mower 100 is in a first configuration (e.g., when the PTO switch 204 is in its off state); and a second engine speed command different than the first engine speed command when the mower is in a second configuration (e.g., when the PTO switch is in its on state).

For example, in the illustrated embodiment, the control system 200 is configured to provide an engine speed command correlating to not only any one of the "maximum," "efficient," and "low" speed settings (switches 218, 216, and 214, respectively) selected by the operator, but also to set the engine speed command to a different engine speed (at least in some circumstances), based on actuation of the same switch, depending on whether the PTO 122 is engaged or disengaged.

In some embodiments, the EC may set engine speed according to Table I when one of the engine speed selection switches (214, 216, and 218) is actuated. In Table I, the subscripts "MAX," "MED," and "LOW" refer to maximum, efficient, and low speed settings of the engine, respectively. Moreover, the subscripts "PD" and "PE" refer to the PTO being disengaged and engaged, respectively.

TABLE I

| Engine Speed Selection Switch Engaged | Engine Speed Command with PTO Disengaged (Switch 204 Off), RPM | Engine Speed Command with PTO Engaged (Switch 204 On), RPM |
| --- | --- | --- |
| "Maximum" Speed Switch 218 | $S_{MAX,PD}$ (e.g., 3650) | $S_{MAX,PE}$ (e.g., 3650) |
| "Efficient" Speed Switch 216 | $S_{MED,PD}$ (e.g., 2500) | $S_{MED,PE}$ (e.g., 3400) |
| "Low" Speed Switch 214 | $S_{LOW,PD}$ (e.g., 1500) | $S_{LOW,PE}$ (e.g., 3250) |

Of course, the exemplary engine speeds identified in Table I are selected based upon the output and other characteristics of a particular engine (e.g., a model ECV940 EFI with EGOV gasoline engine distributed by Kohler Engine Division, Kohler Co., of Kohler, Wisconsin, USA) and/or a particular implement. As a result, other engine speeds for some or all of the categories identified in Table I are certainly possible without departing from the scope of this disclosure. Moreover, while the maximum engine speed switch 218 provides the same engine speed regardless of the position of the PTO switch 204, other embodiments may apply a speed differential between these two conditions as well.

As shown in Table I, the engine speed may be commanded to a discrete speed setting based upon operator selection (e.g., via actuation of one of the switches 214, 216, and 218) and on whether the PTO 122 is engaged or disengaged. In some embodiments, at least one of the switches, e.g., the low engine speed selection switch 214, may provide further functionality. For example, actuation of the low engine speed selection switch 214 for a period of time less than a predetermined first or initial threshold period may result in the EC 220 commanding a speed of the engine 104 to a first preset or predetermined speed (e.g., see $S_{LOW,PE}$ in Table I above). However, actuation of the low engine speed selection switch 214 for a period of time equal to or greater than the initial threshold period may result in the EC 220 commanding the speed of the engine to a second preset speed different than the first preset speed. The EC 220 may further be operable to command the speed of the engine 104 to a third preset speed, different than both the first and second preset speeds, upon continued actuation of the low speed selection switch 214 for a total period of time greater than a predetermined second threshold period (which is, of course, greater than the initial threshold period). Such a process may continue until the speed command reaches a minimum speed threshold, below which implement/vehicle performance (e.g., resistance to engine stall) may be detrimentally affected.

In some embodiments, the initial threshold period is equivalent to a predetermined step interval, and all subsequent threshold periods are set equal to a multiple of the step interval. For instance, the initial threshold period described above may be equal to a step interval of x seconds, wherein the second threshold period would then be equal to 2(x) seconds, a third threshold period would be equal to 3(x) seconds, etc. (see FIG. 4B).

Figure 4A:
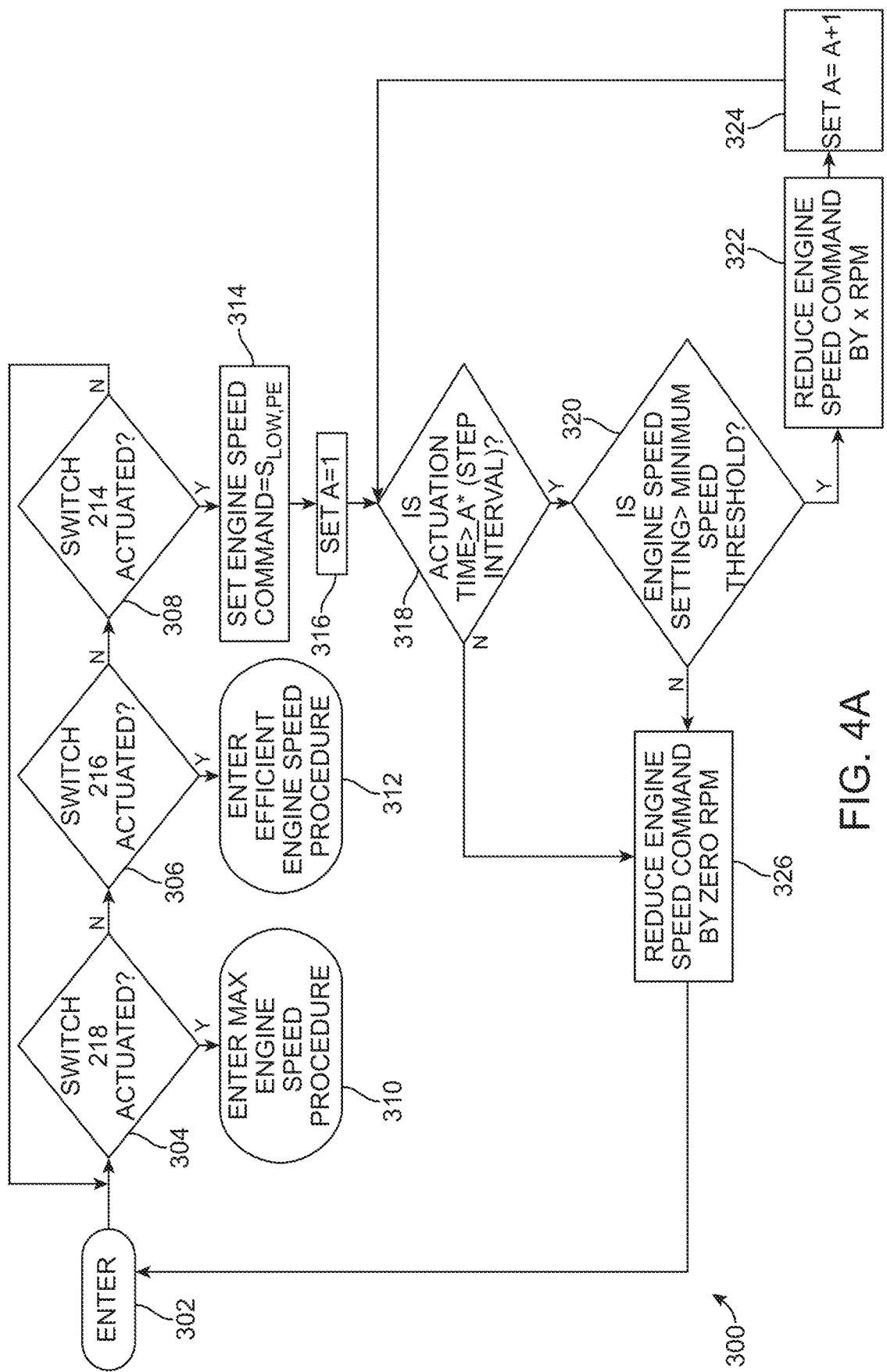
FIG. 4A is a flow chart illustrating an exemplary procedure for adjusting an engine speed command provided to a prime mover (e.g., an engine) of the mower.

An example of such an EC speed control process 300 is illustrated in FIG. 4A. As shown in this view, the process is entered at 302. The EC may monitor the status of the switches 218, 216, and 214 at 304, 306, and 308, respectively. In the event that the switch 218 or 216 is actuated, the EC 220 may enter the appropriate engine speed command procedure at 310 or 312, respectively. As the following exemplary embodiment is focused on functionality of the low engine speed selection switch 214, the procedures of 310 and 312 are not further addressed herein. However, those of skill in the art will appreciate that a process similar to that described herein with respect to the switch 214 may, in other embodiments, be applied to the switches 218 and 216 without departing from the scope of this disclosure.

Once the EC 220 detects actuation of the switch 214 at 308, the EC may issue a first engine speed command equal to $S_{LOW,PE}$ at 314. Note that this description assumes that the PTO 122 is already engaged such that the implement (e.g. cutting deck 114) is running. If the PTO is not engaged, the EC may engage the PTO via an engagement process such as that described in U.S. Pat. No. 9,002,585. Moreover, while this process is described for operation when the PTO is engaged, it may optionally apply to transport (PTO disengaged) modes as well.

The EC 220 may then set a counter "A"=1 as indicated at 316 in FIG. 4A. The EC may continuously monitor, or receive a signal indicative of, an actuation interval or time that the switch 214 remains actuated (e.g., the time that the operator presses or holds the switch in its on state) and compare that time to a step interval at 318. If the EC determines that the actuation time is less than the step interval at 318 (e.g., if the switch is released (e.g., placed in its off state) before expiration of the step interval), the process may progress to 326, whereby engine speed is unaffected, and control is returned to 302.

If, on the other hand, the EC determines that the actuation time is greater than or equal to the product of the counter "A" (set to a value of one initially) multiplied by the step interval, the EC may progress to 320. At 320, the EC may check to ensure that the engine is running above a minimum speed threshold (e.g., a threshold set at 2,000-2400 RPM, below which implement operation may be detrimentally affected). If the engine speed is determined to be in excess of the minimum threshold speed at 320, the EC may issue a command to the engine speed regulator (e.g., EGOV 222 of FIG. 3) to reduce the engine speed command at 322 by a predetermined increment or amount (e.g., "x" RPM).

The EC 220 may then index the counter "A" by one at 324 and return control to 318 as shown in FIG. 4A. The current actuation time is then compared again to the product of the step interval multiplied by the counter A (now equal to 2) at 318. If step 318 is satisfied, and engine speed is still above the minimum speed threshold at 320, the EC may again issue to the EGOV a revised (e.g., reduced) engine speed command at 322 to reduce engine speed by "x" RPM. This process may continue until the EC determines that the engine speed is no longer greater than the minimum speed threshold of the engine at 320. When this occurs, the algorithm may progress to 326, resulting in no further change in engine speed, after which control is returned to 302.

As one can appreciate, the EC 220 may thus actually determine the number of expired step intervals encompassed by the detected switch actuation time (see, e.g., 318). Based upon this determination, the EC may, in real time, continuously step the engine speed command downwardly in proportion to the actuation time of the switch 214, e.g., in synchronization with each expired step interval.

By way of example only, the step interval may be a fixed value set by the EC of 0.3-0.6 seconds, e.g., 0.4 seconds. If the operator actuates the switch 214 for less than 0.4 seconds, the EC 220 will command the engine speed to $S_{LOW,PE}$ (e.g., 3250 RPM) at 314 and such speed will not be altered by the process 300. However, if the operator continues to hold the switch 214 in the on state for more than 0.4 seconds (one step interval), the EC may command the engine speed to reduce by the predetermined value "x," e.g., 50 RPM. Likewise, if the switch 214 remains actuated for more than 0.8 seconds (two step intervals), the EC may again ramp the engine speed command down by another 50 RPM. This process may continue until the engine speed command is at or near the minimum speed threshold, e.g., 2250 RPM, at which point further actuation of the switch 214 has no effect on engine speed command due to the determination made at 320. If the switch 214 is released and subsequently actuated again, the EC may return the engine speed command to the preset $S_{LOW,PE}$, where it may again ramp the speed command downwardly if the switch remains engaged (in the on state). In another embodiment, instead of returning to the preset $S_{LOW,PE}$ and ramping the speed downwardly therefrom, actuating the switch 214 again could instead begin ramping downwardly from the previous speed set point (e.g., the EC could generate a reduced third engine speed command that is lower than a second engine speed command present when the switch 214 is first re-actuated. Of course, generating the third engine speed command could require that the switch 214 be actuated for a period of time greater than the step interval).

The processor 221 of the EC 220 (see FIG. 3) may execute the process 300 (including steps 318, 320, 322, and 324) several times a second, resulting in the EC effectively stepping the engine speed command down (in steps of 50 RPM) in proportion to the actuation time of the switch 214. Accordingly, the operator may achieve a range of desired lower engine speeds, using the single switch 214, via a simple (e.g., press-and-hold) action, and without the need for supplemental engine speed controls.

Figure 4B:
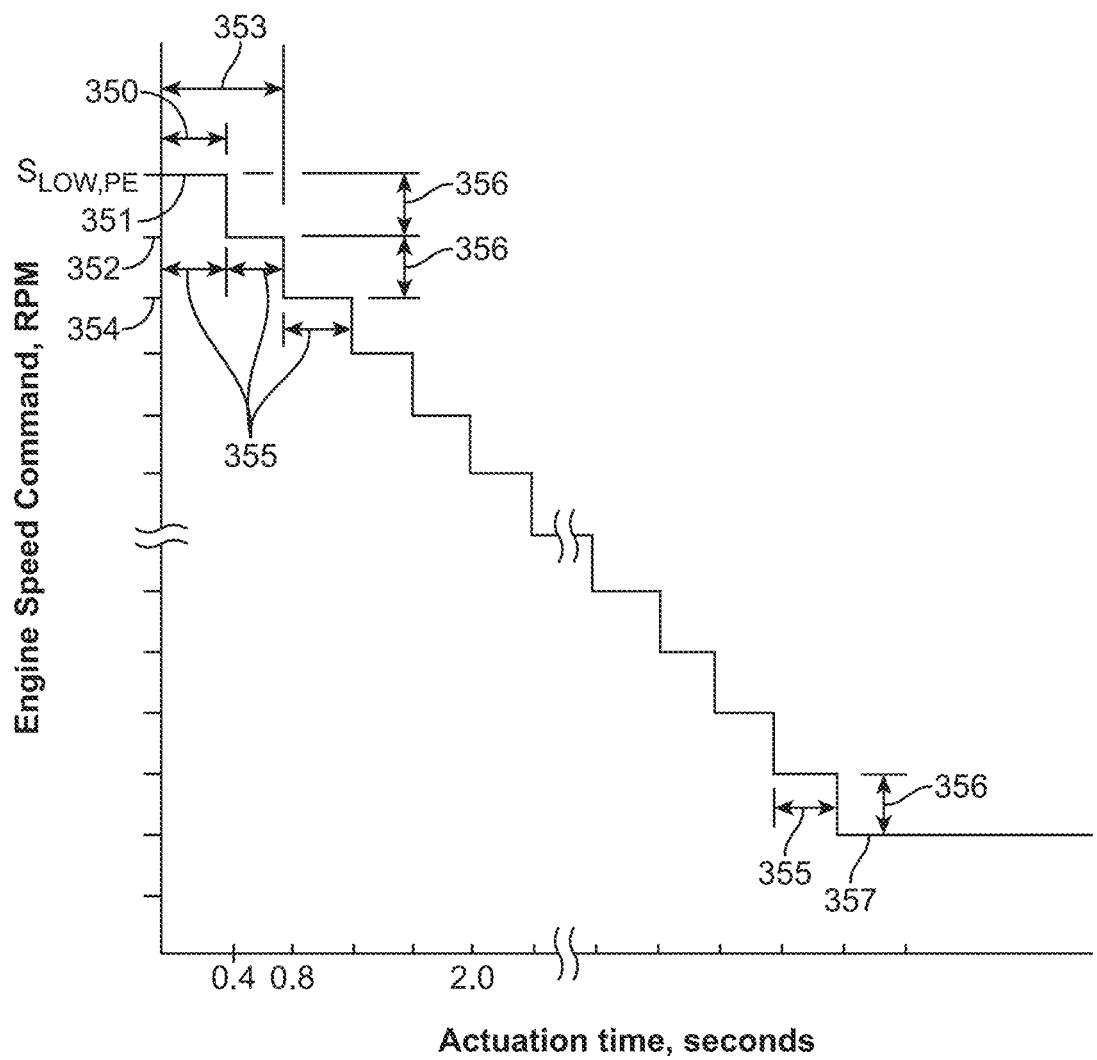
FIG. 4B is a graph illustrating engine speed command vs. actuation time of an engine speed selection switch in accordance with one embodiment of the disclosure.

FIG. 4B is a graph illustrating engine speed command generated by the EC vs. actuation time of the low engine speed selection switch 214 in accordance with embodiments of this disclosure. As stated above, as long as the actuation time of the switch is less than the first threshold period 350 (e.g., 0.4 seconds), the engine speed command will be set to the first preset speed 351, e.g., $S_{LOW,PE}$. However, if the actuation time of the switch 214 is for a period of time equal to or greater than the first threshold period 350, the EC may command the speed of the engine to a second preset speed 352 different (e.g., 50 RPM less) than the first preset speed 351. Moreover, if the switch 214 remains actuated for a period of time equal to or greater than the second threshold period 353, the EC may command the speed of the engine to a third preset speed 354 different (e.g., 50 RPM less) than the second preset speed 352. This process may continue until the commanded speed is at or near the minimum speed threshold at 357.

In the embodiment illustrated in FIG. 4B (using the process 300 of FIG. 4A), the first and second threshold periods 350, 353 may correspond to a multiple (e.g., one and two, respectively) of the step interval 355 that, in one embodiment, may be 0.4 seconds. However, in other embodiments, the threshold periods could be different (e.g., the EC may utilize a variable step interval). Moreover, while shown herein as altering the engine speed command by a predetermined increment 356 of 50 RPM for each step, other embodiments may vary this increment.

By providing the EC with low engine speed functionality like that described, the operator may reduce low speed implement operation where the default low engine speed $S_{LOW,PE}$ is perceived as too high. For example, a speed lower than $S_{LOW,PE}$ may be beneficial when mowing around landscaped beds to, for example, reduce the distance and velocity of discharged clippings into and immediately around the beds.

Property Statistics

While the switches 214, 216, and 218 of the ID 210 may function as engine speed control inputs during mower operation, the EC 220 may provide a variety of other functions also accessible through the ID and its associated switches. One such function provided is related to tracking and reporting individual property statistics, embodiments of which are now described.

In commercial landscape contracting, accurate tracking and capture of the costs associated with servicing each property are important as such information allows the equipment operator to profitably provide services. Typically, cost is estimated through the use of a conventional engine hour meter. That is, subtracting the hour meter reading at the beginning of a job (property) from the hour meter reading at the end of the job to arrive at a number that correlates to job cost. While effective, engine run time may not always reflect the true cost associated with a particular property. For example, a property having hilly terrain may utilize more fuel than a similarly sized, but flat, property.

Figure 5:
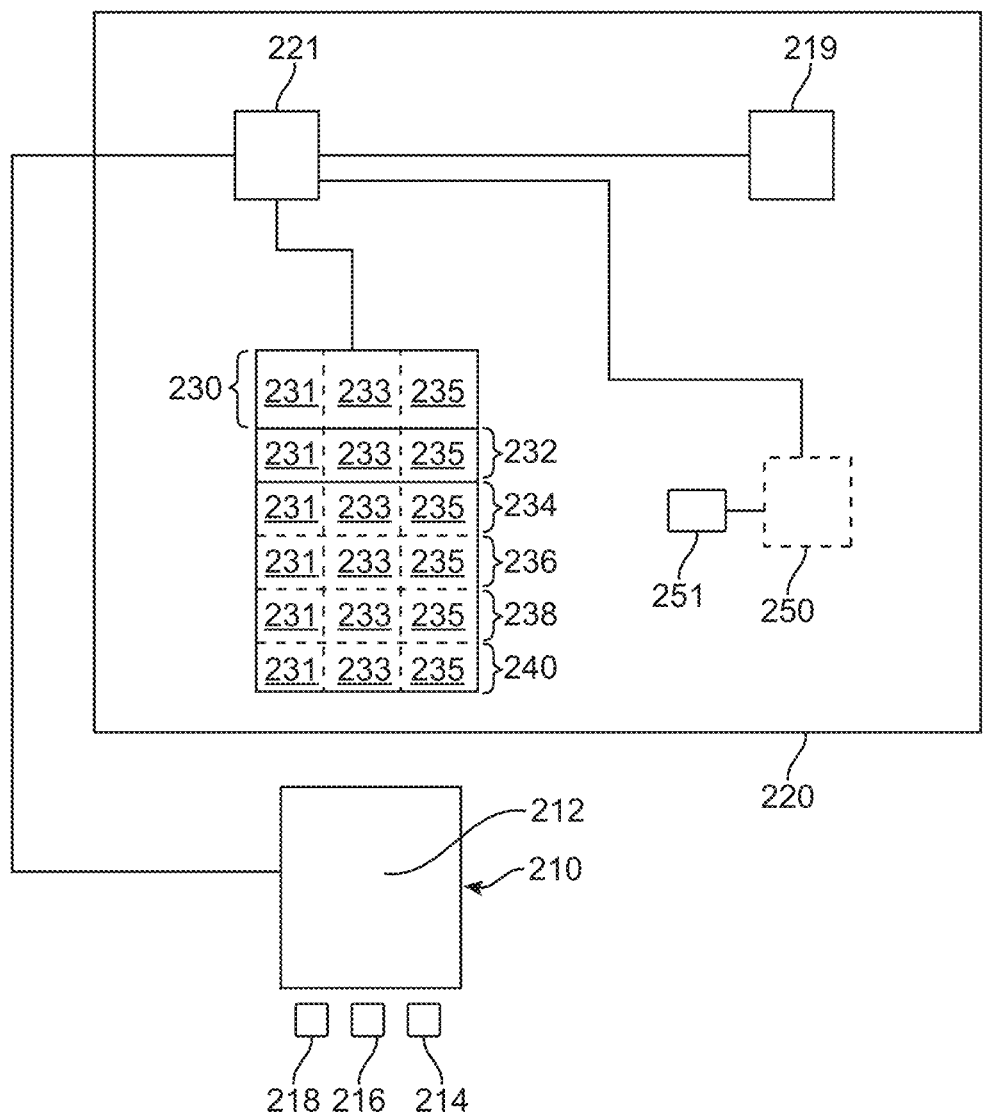
FIG. 5 is a schematic view of the EC and ID in accordance with one embodiment of the disclosure.

To address these issues, embodiments of the present disclosure may provide the EC 220 with property tracking capability. For instance, in some embodiments, the EC 220 may, as shown in FIG. 5, include a first or system memory 230 and a second or property memory 232. One or both of the system memory 230 and the property memory 232 may further include one or more storage portions. For example, one or both of the memories 230 and 232 may include: a first storage portion 231 adapted to record an accumulated time that the PTO 122 (see FIG. 3) has been engaged; and a second storage portion 233 adapted to record an accumulated time that the prime mover (e.g., engine 104) has been operating ("accumulated engine run time"). The property memory 232 may be resettable such that its associated storage portions 231, 233 are selectively reset to a zero value (reset such that the accumulated time that the engine has been operating and the accumulated time that the PTO has been engaged are both set back to zero). However, the system memory 230 is non-resettable such that its respective storage portions reflect, at all times, the accumulated engine run time and PTO engaged time over the life of the mower. Stated another way, the contents of the system memory 230 are preserved even when the contents of the property memory 232 are selectively erased.

In addition to monitoring accumulated or elapsed engine run time and PTO engaged time, either or both of the system and property memories 230, 232 may also track other statistics including, for example: an accumulated volume of fuel used by the engine; average fuel economy; average engine speed; etc. and store/record such information in an associated third storage portion 235. Of course, such additional data stored in the third storage portion associated with the property memory 232 may be resettable (reset to a zero value) whenever the property memory is reset.

As used herein, the term "memory" (or "memory unit") refers, without limitation, to any electronic memory operable to store and retrieve information. Like the memory 219 of the EC 220, each memory 230 and 232 (and their corresponding storage portions), as well as the maintenance memory 251 described below, may include any appropriate volatile, non-volatile, magnetic, optical, and/or electrical media, such as a random access memory (RAM), read-only memory (ROM), non-volatile RAM (NVRAM), electrically-erasable programmable ROM (EEPROM), flash memory, and/or any other digital media that can store the associated data and, in the case or the property memory, be selectively resettable/erasable.

As stated above, the property memory 232 is selectively (e.g., via operator action) erasable to permit the reset function, while the system memory 230 is non-erasable (additional time will accumulate and be retained permanently). Moreover, as used herein, the term "storage portion" is used merely to identify a portion or register of a memory (or an independent memory device accessible by the memory) where data is actually stored. "Resettable," as used herein, indicates only that the memory, e.g., property memory (and/or its individual storage portions), may be reinitialized to a zero value, wherein any data (e.g., accumulated time) stored therein are removed, thereby allowing the mower/EC to track statistics from zero for a new property. The phrase "non-resettable" is used to indicate that the memory, e.g., system memory (and/or its individual storage portions), is not adapted to be re-initialized, i.e., a non-resettable memory will reflect all data accumulated since first use of the vehicle.

It is noted that additional property memories may be provided to permit storing property statistics for additional properties. For example, in addition to the property memory 232, the EC 220 may include one or more additional property memories, each being capable of storing data regarding a specific property (e.g., each having storage portions 231, 233, and 235), and each being independently re-settable. For instance, in one embodiment, the EC may include: a second property memory 234; a third property memory 236; a fourth property memory 238; and a fifth property memory 240, wherein contents of one property memory (e.g., the second property memory 234) may be erased while preserving the contents of the other property memories (e.g., the first property memory 232). As the memories 232, 234, 236, 238, and 240 are resettable, the mower may be able to store individual statistics (e.g., engine run time (associated with storage portion 231), PTO engaged time (associated with storage portion 233), fuel utilized since last reset (associated with storage portion 235), etc.) for up to five individual properties. By providing multiple property memories, the operator may be able to collect and retain property statistics for an entire day before a reset of any property memory is required. As a result, the transfer of property statistics to a billing system or log may be deferred until the end of the work day, after which the property memories may be reset before the next day's operations. Moreover, by providing multiple property memories, one property memory (e.g., the fifth property memory 240) may be reserved for recording statistics for an entire service (e.g., mowing) season. Such a use may be beneficial to, for example, track total fuel usage as a basis for seeking potential rebates on road taxes for a given year. A vehicle owner may also assign one property memory to a particular operator to determine, for example, that operator's efficiency compared to others.

Transferring data from any of the EC's memories (e.g., 230, 232, 234, 236, 238, and 240, as well as from memories 219 and 251) to an operator billing system or log may be accomplished via most any acceptable method. For instance, manual transfer, as well as electronic data uploading (wired or wirelessly) of the contents of the memories is contemplated.

Figure 6:
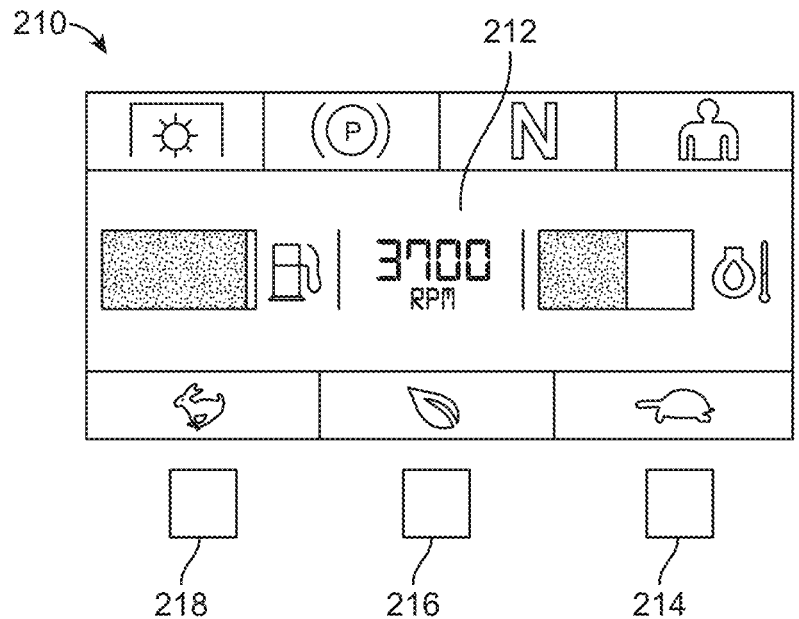
FIG. 6 is an exemplary default screen that may be displayed on the ID during vehicle operation.
Figure 7:
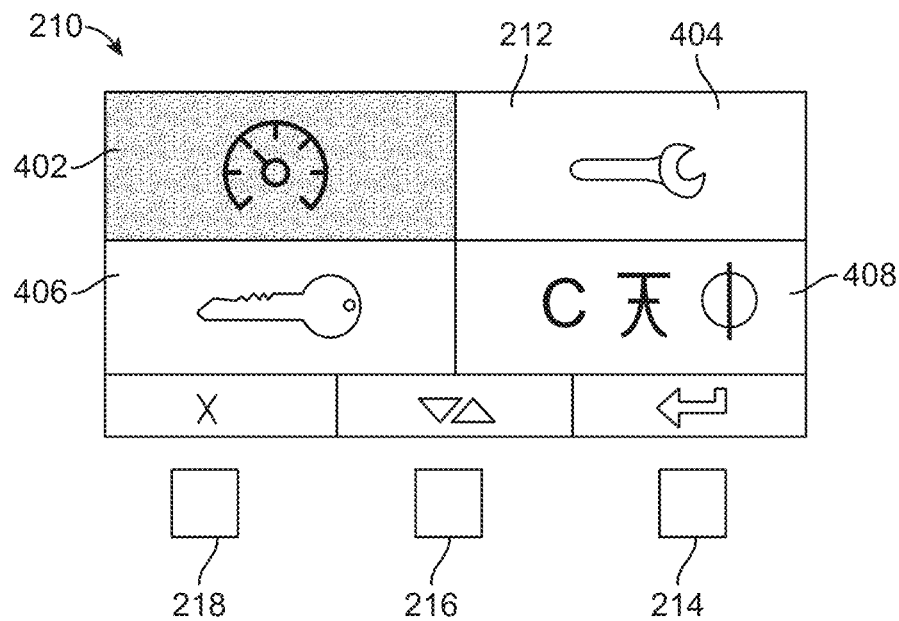
FIG. 7 is an exemplary menu screen that may be displayed on the ID.

In some embodiments, the operator may interact with the property statistics information via the ID 210 and its switches 214, 216, and 218. For instance, although EC/ID may typically assign engine speed settings to the switches 214, 216, 218 as shown in FIG. 6, (see icons along lower edge of exemplary ID screen 212, such icons corresponding to the current function of the switches 214, 216, and 218), simultaneously pressing a key combination (e.g., keys 214 and 218) may cause the EC 220 to enter a menu mode, an exemplary ID screen of which is illustrated in FIG. 7. Upon entering the menu mode, icons corresponding to various aspects of the control system may be presented on the screen 212. For example, as shown in FIG. 7, the screen 212 may initially present: a meter icon 402; a service icon 404; a settings icon 406; and a language selection icon 408. Moreover, the function of the switches 214, 216, and 218 may now be mapped to: cancelling the current operation (218); navigating through the icons presented (216); and selecting the highlighted icon (214).

To access property statistics, the meter icon 402 (highlighted in FIG. 7) may be selected (if the meter icon is not highlighted, the switch 216 may allow navigation through the available icons until the meter icon is highlighted) by actuating (e.g., pressing) the switch 214. After pressing the switch 214, the operator may navigate (again using the switches 214, 216, and 218 to interact with information presented on the screen 212 of the ID 210) to any one of the property statistics screens.

Figure 8:
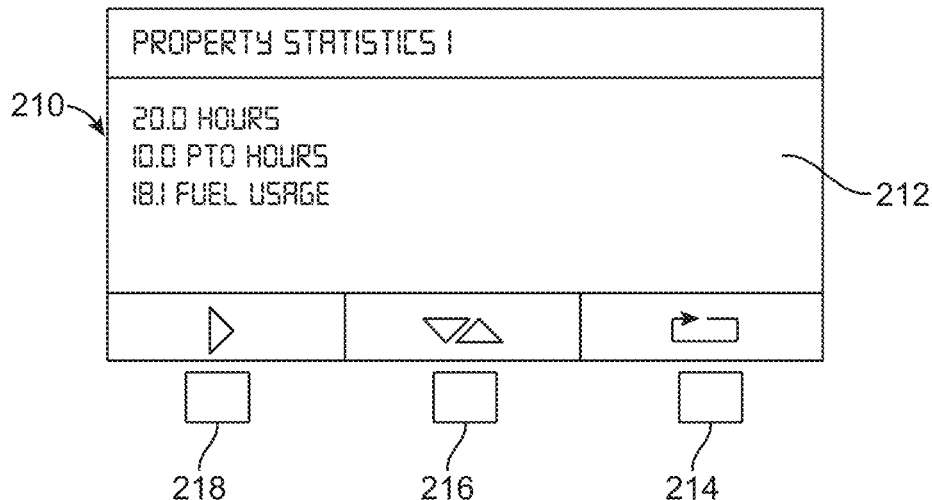

A first property statistics screen (e.g., "Property Statistics 1" corresponding to the data stored in the storage portions of the property memory 232 of FIG. 5) may appear as shown in the ID screen 212 of FIG. 8. This screen illustrates the contents of the property memory 232 after the mower has been operating for some time (since the last reset). As a result, statistics representing accumulated engine run time, accumulated PTO engaged time, and volume of fuel used are presented as shown (while shown in FIG. 8 in relation to the property memory 232, a similar screen can be viewed for any of the other property memories, and for the system memory 230 (the latter showing total statistics over the life of the mower)). The screen presented in FIG. 8 also shows the statistics in a "paused" mode, i.e., recording accumulation of additional statistics (e.g., PTO engaged time, engine run time) to the property memory 232 is suspended. The operator may start/resume recording of statistics (e.g., PTO engaged time, engine run time) to the property memory 232 again by selecting the "play/resume" function now associated with switch 218. After actuating the switch 218, the EC 220 will again begin to accumulate the engine run time, PTO engaged time, and fuel used and additively store such accumulated information in the property memory 232. Fuel usage may be determined by a number of methods and/or devices including, for example: detecting a change in level of fuel 133 contained in a fuel tank 134 (e.g., using a sensor 135 as indicated in FIG. 3); monitoring fuel flow into the engine 104 with a flow sensor (not shown); or by calculating fuel usage based upon data provided, by an engine-specific controller (not shown), to the EC.

Alternatively, if the operator wishes to reset the property memory 232, the switch 214 may be actuated (when the screen of FIG. 8 is presented). Upon actuation of the switch 214 (e.g., engaging the switch, e.g., for more than one second), the storage portions associated with the property memory unit may be reset, such that counters for engine run time, PTO engaged time, and fuel used are reset to zero as shown in the screen 212 of FIG. 9. The operator may, at the appropriate time, actuate the switch 218, now corresponding to a "play" function (see icon above switch 218 in FIG. 9), to begin recording new (e.g., from zero) statistics to the property memory 232.

Figure 9:
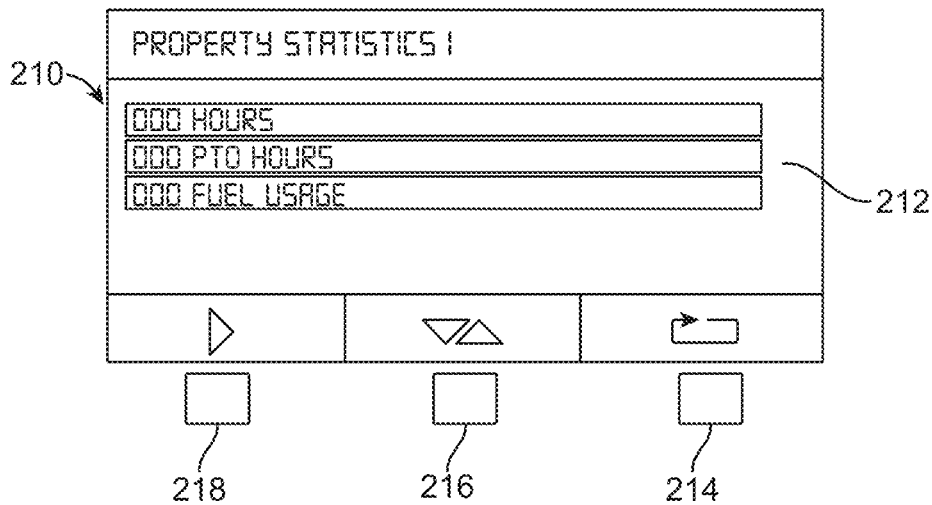
Figure 10:
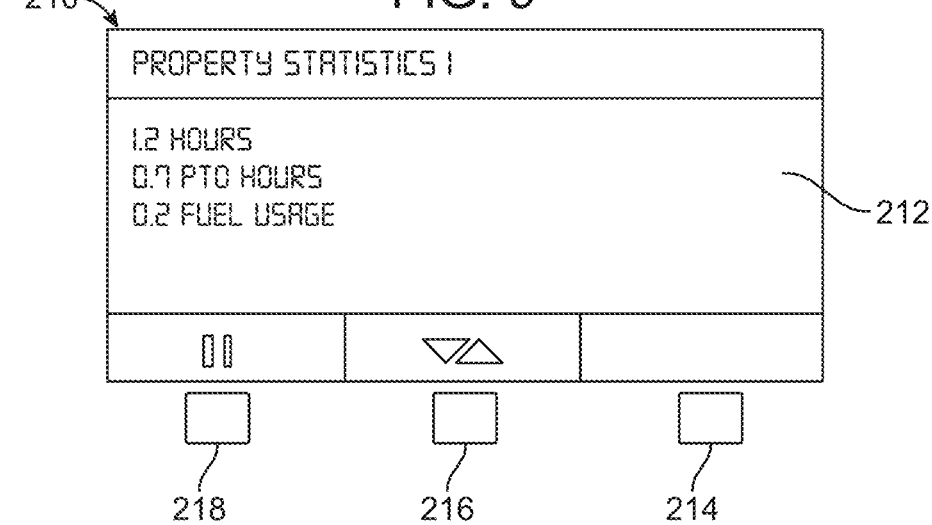

Once the play (i.e., record) function is activated as shown in FIG. 9, property statistics will begin to accumulate to the property memory 232 and this accumulated information will be displayed on the appropriate ID screen 212 as illustrated in FIG. 10. If the operator wants to pause or suspend accumulation of property statistics to the property memory 232 for any reason, the operator may navigate again to the desired property statistics screen. Instead of presenting the screen shown in FIG. 8, however, the ID may now illustrate a "pause" icon above the switch 218 as shown in FIG. 10. Actuation of the switch 218 will then pause the accumulation of additional data to the property memory 232 until the switch 218 (whose respective function reverts back to "play" after pausing) is again actuated, at which point property statistics are again accumulated. The switch 218 may thus operate as a pause/resume input to selectively pause recording of data to the storage portion(s) of the associated property memory, and then resume recording when the switch 218 is subsequently actuated.

While only the ID screen renderings for the property statistics associated with the first property memory 232 are shown, similar screens, and similar functionality, are provided for each of the property memories (e.g., 234, 236, 238, and 240 of FIG. 5).

As one of skill may appreciate, multiple and resettable property statistic logging may thus simplify accurate capture of data associated with each property.

Modified Service Intervals

In addition to providing resettable property statistics, the EC 220 may further provide a maintenance monitor carried by the chassis and adapted to indicate when various maintenance tasks, e.g., changing of engine oil 130 (see FIG. 3), changing of transmission oil 131 (see also FIG. 3), changing of gearbox oil, etc., should be performed. In addition to indicating when these maintenance tasks are due, the maintenance monitor may also include a maintenance memory to permanently store or record an onboard log indicating, at each time the maintenance task was completed, a record of: completion of the maintenance task; and either the accumulated run time of the engine, or the accumulated time that the PTO has been engaged. Accordingly, as used herein, "maintenance interval," as it refers to any specific maintenance task, may refer to either: an elapsed run time of the prime mover since the maintenance task was last performed (or until the maintenance task is again due); or an elapsed time that the PTO has been engaged since the maintenance task was last performed (or until the maintenance task is again due). The maintenance monitor may also include a first input associated with the ID. The first input may be adapted to receive operator input indicating that the maintenance task is complete. After receiving the operator input, the maintenance interval may be reset to either: a first duration; or a second duration different than the first duration.

The maintenance monitor may be also be adapted to receive one of either a first or second maintenance input corresponding to a first or second parameter of the maintenance task, respectively. For example, the maintenance monitor, via the ID 210, may request the operator to select a type of oil being used, wherein the first maintenance input (e.g., selection of a premium oil) results in the maintenance monitor setting the maintenance interval to the first duration, and the second maintenance input (e.g., not selecting a premium oil) results in the maintenance monitor setting the maintenance interval to the second duration. As a result, the actual maintenance interval that will elapse before the operator again receives an indication that the particular maintenance task is due may be adjusted by the maintenance monitor to better correlate to an expected service life of the product (e.g., engine, transmission, or gearbox oil) used (see, e.g., FIG. 16).

While the selection of this maintenance parameter is limited in this example to whether or not a specific premium product was used (e.g., to a product or component (e.g., oil, lube, grease, belts, etc.) having a longer expected service life than a standard version of the product or component), other embodiments of the maintenance monitor may present multiple (e.g., a list of) options (e.g., three or more oil types) from which to select. Some of these options could be pre-programmed, while others could be user-definable, and each option could set a different maintenance interval.

It is noted that, while described herein in the context of engine, transmission or gearbox oil, the actual maintenance task may include most any maintenance activity associated with the mower 100. For instance, the maintenance monitor may alter the maintenance interval for maintenance tasks including, for example: air cleaner replacement; spark plug replacement; fuel filter replacement; belt replacement; and chassis lubrication based on the particular replacement product or component utilized.

As shown in FIG. 5, the maintenance monitor may be an electronic controller 250 incorporated into, or otherwise in communication with the EC 220 (e.g., with the processor 221 of the EC). In other embodiments, the maintenance monitor may be embodied in the processor 221 (e.g., it may be a program executed by the processor). The maintenance monitor and/or the EC may be configured to constantly monitor and record the accumulated run time of the engine and the accumulated time that the PTO has been engaged (the total time that the PTO has been engaged for operation). A maintenance memory 251 (which could be part of the memory 219) may also be included to permanently store a record of: completion of the maintenance task; and the accumulated run time of the engine (and/or the accumulated engagement time of the PTO) at the time the maintenance task was completed. As with other systems described herein, the maintenance monitor may include, or otherwise utilize, the ID 210 as an input/output device for interacting with the operator or service technician regarding maintenance tasks. Transferring data from the maintenance monitor to an external device or maintenance log may be accomplished via most any acceptable method. For instance, manual transfer, as well as electronic data uploading (via a wired or wireless connection) of the contents of any stored memory are contemplated.

Figure 11:
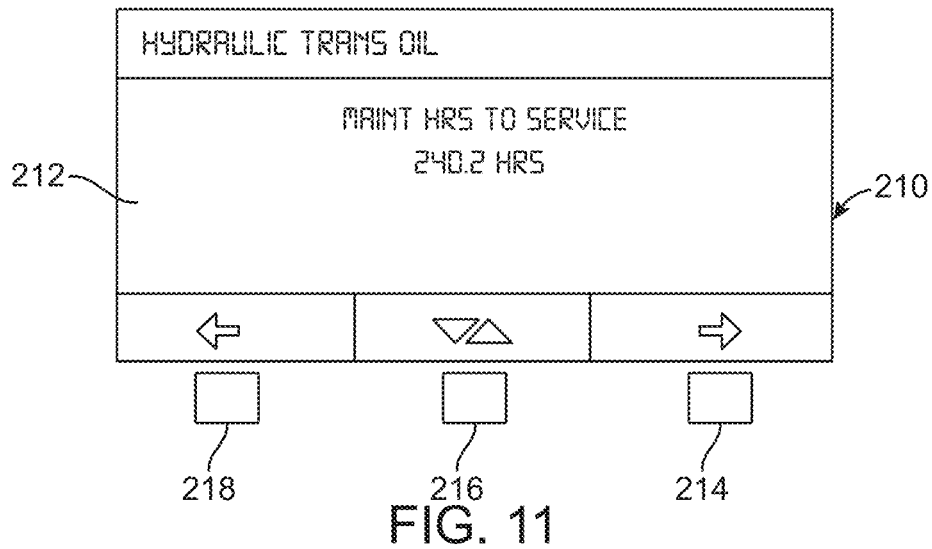

To access maintenance records, the operator may navigate to the menu screen (see FIG. 7) and select the maintenance icon 404. This will bring the user to the maintenance monitor functions, of which one screen is illustrated in FIG. 11. The operator or technician may cycle through other maintenance screens using the navigation functions now assigned to the switches 214 and 218 as shown to determine a status of one or more maintenance intervals each corresponding to the performance of a maintenance task.

Figure 12:
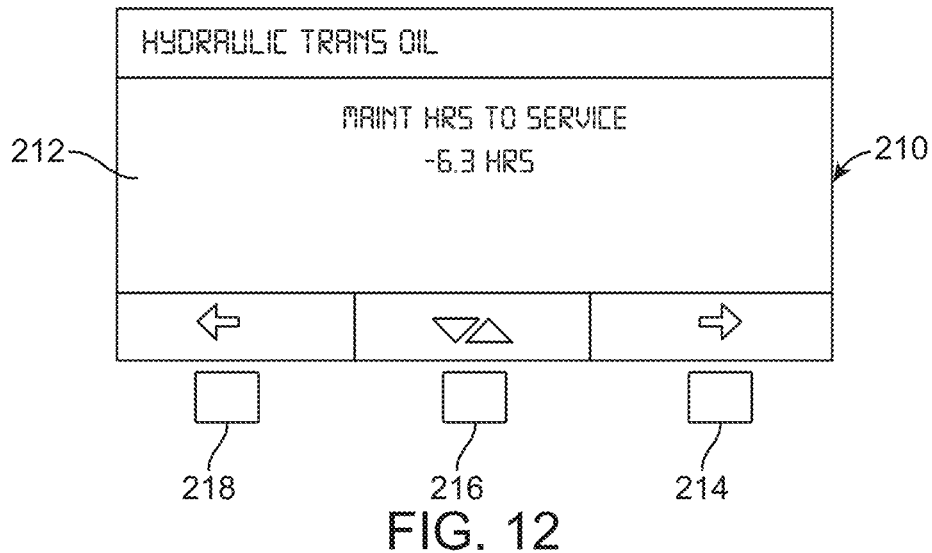
Figure 13:
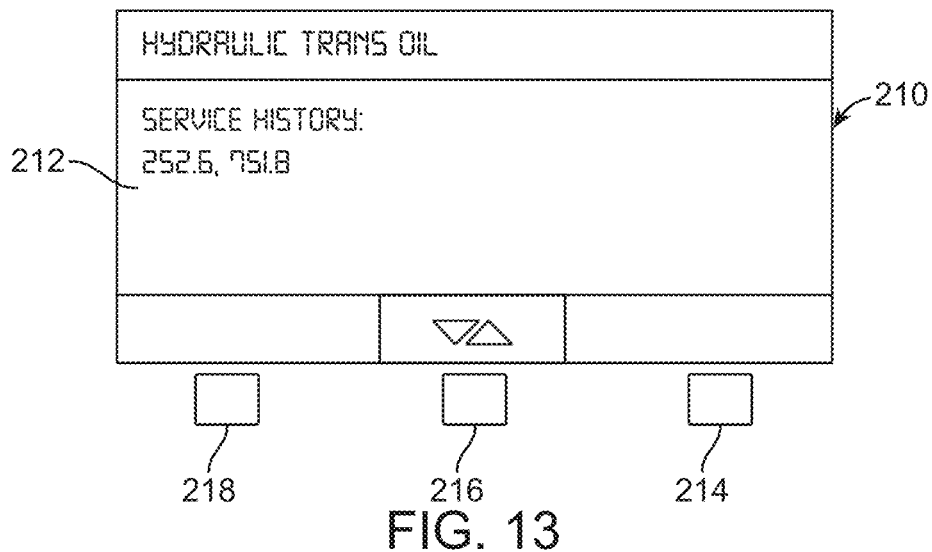

The ID 210 may display a status screen 212 like that illustrated in FIG. 11 showing the remaining hours to elapse until, in this example, changing the transmission oil is recommended. If the mower 100 has operated beyond the recommended maintenance interval (e.g., the maintenance task is past due), the remaining hours until maintenance is due may be shown as a negative number (e.g., hours past due) as indicated in FIG. 12. Actuating the switch 216 (at either of the screens shown in FIGS. 11 and 12) may then show the service history for previous transmission oil changes as shown in FIG. 13. As indicated, service history may be indicated by showing the accumulated, non-resettable engine hours for each time this specific maintenance reminder was previously reset. Screens similar to FIGS. 11-13 may be presented for other maintenance tasks such as changing engine oil and gearbox oil, belts, air filters, etc.

Figure 14:
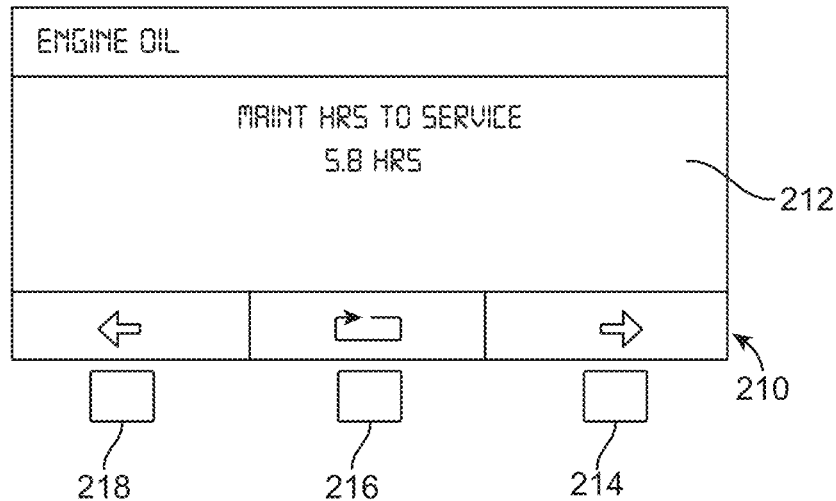
Figure 15:
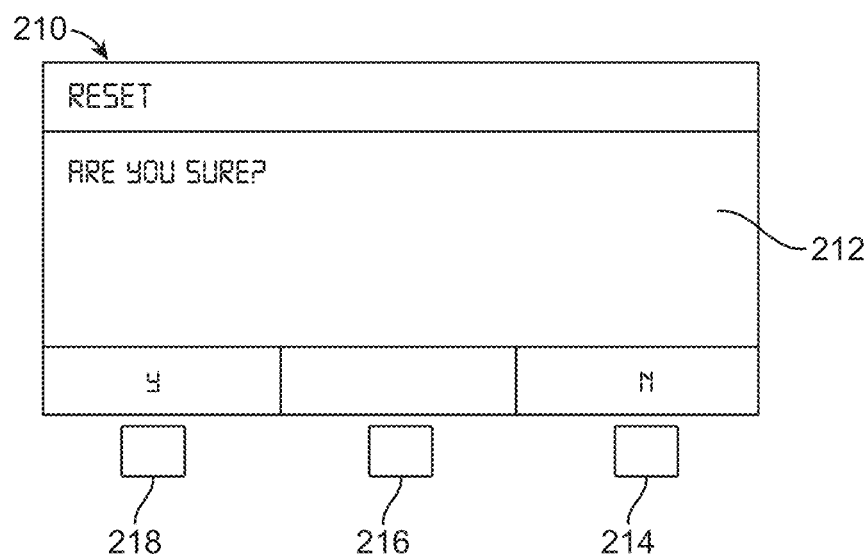
Figure 16:
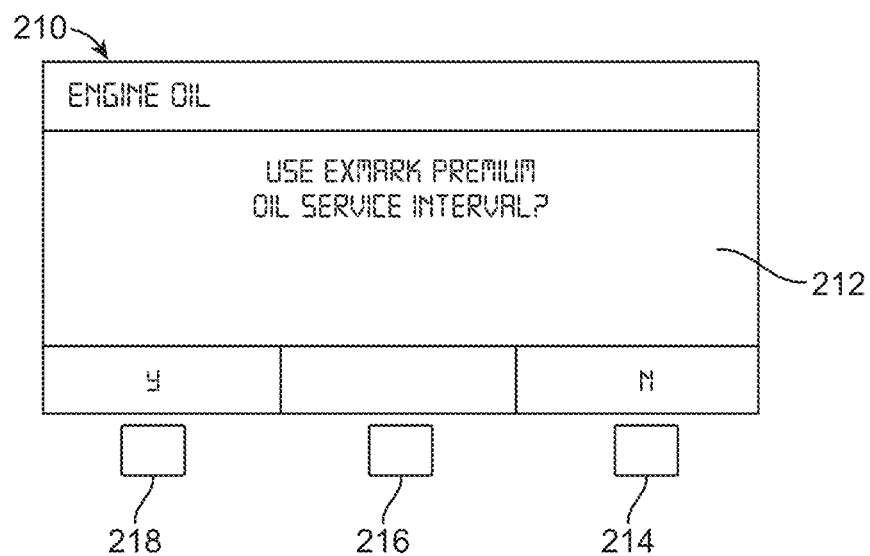

FIGS. 14-16 illustrate an exemplary procedure that the operator or service technician may execute during or after performance of a specific maintenance task to set the length of the next maintenance interval. While described and illustrated in the context of changing engine oil, the same procedure would apply to other maintenance tasks (e.g., changing transmission oil). In one embodiment, the maintenance interval reset function is accessed via an "Advanced Settings" icon 406 as shown in FIG. 7.

Upon entering the Advanced Setting menu, the system may require entry of a system passcode, which again may be input using the switches 214, 216, and 218 (passcode entry screen not shown). As shown in FIG. 14, once the maintenance task reminder indicates that the task is due (or about due), the maintenance task (e.g., changing engine oil) may be completed in accordance with the manufacturer's recommendations.

After task completion, the maintenance reminder may be reset by, for example, accessing the screen shown in FIG. 14 (if not already present) and pressing the switch 216 (while shown with reference to engine oil, generally the same screens may be presented (only the title bar would change) for other maintenance tasks, e.g., changing transmission oil). The maintenance monitor may then prompt for confirmation of the reset as shown in FIG. 15. Once confirmed by actuation of the switch 218, the ID 210 may prompt the operator/technician for the type of oil used. For example, as shown in FIG. 16, the maintenance monitor may ask (via the screen 212 of the ID 210) if a premium oil (e.g., extended life oil that has an expected service life greater than a standard engine oil) was used. If the answer is yes, the operator/technician may press the switch 218 confirming the same. If, on the other hand, a premium oil was not used, the operator/technician may indicate the same by pressing the switch 214.

While the selection of this maintenance parameter (e.g., premium oil having an expected service life greater than a typical engine oil) is limited in this example to whether or not a specific premium product was used, other embodiments of the maintenance monitor may present multiple (e.g., a list of) options (different oils) from which to select.

In the illustrated embodiment, if the premium oil is indicated, the maintenance monitor may set the next maintenance interval for this maintenance task to a first duration (e.g., 500 hours). However, if not selected, the maintenance monitor may select the next maintenance interval to a second duration different (e.g., lower) than the first (e.g., 250 hours).

While described herein as utilizing an elapsed run time of the prime mover (e.g., engine 104) to establish maintenance intervals for various maintenance tasks, such a configuration is exemplary. That is, other embodiments may utilize other triggers to establish the maintenance interval. For instance, some mowers could establish maintenance intervals based upon an accumulated time that the PTO has been engaged (since the maintenance task was last performed). Such embodiments may be useful for maintenance tasks (e.g., belt replacement) that are more dependent upon PTO engagement time rather than on engine run time.

Accordingly, the maintenance monitor may adjust the maintenance interval for at least some maintenance tasks to reflect a selection parameter (e.g., premium oil) of a particular maintenance item used. As a result, more cost-effective vehicle operation may be achieved by, for example, extending the next maintenance interval when a premium product (e.g., oil) is used as opposed to maintaining a static maintenance interval regardless of the product used.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method of operating a turf maintenance vehicle, the method comprising:
   detecting when an engine of the vehicle is running, the vehicle carrying an implement that receives power from the engine only when a power take-off (PTO) associated with the engine is engaged;
   recording, while the vehicle is in a first state, an accumulated run time of the engine exclusively to a system memory and a first property memory;
   detecting, while the vehicle is in the first state, whether the PTO is engaged;
   recording, while the vehicle is in the first state, an accumulated time that the PTO has been engaged exclusively to the system memory and the first property memory; and
   recording, when the vehicle is in a second state different than the first state, an accumulated run time of the engine exclusively to the system memory and a second property memory separate from the first property memory.

2. The method of claim 1, further comprising pausing, while the vehicle is in the first state, recording to the first property memory of: the accumulated time that the PTO has been engaged; and the accumulated run time of the engine.

3. The method of claim 2, further comprising resuming, while the vehicle is in the first state, recording to the first property memory of: the accumulated time that the PTO has been engaged; and the accumulated run time of the engine.

4. The method of claim 1, further comprising determining, while the vehicle is in the first state, an accumulated volume of fuel used by the engine, and recording the accumulated volume of fuel used to the first property memory.

5. A method of operating a turf maintenance vehicle, the method comprising:
    detecting, while the vehicle is in a first state, whether a power take-off (PTO) associated with a prime mover of the vehicle is engaged or disengaged, wherein the PTO operatively connects an implement associated with the vehicle to the prime mover when the PTO is engaged, and operatively disconnects the implement from the prime mover when the PTO is disengaged;
    recording, while the vehicle is in the first state, an accumulated time that the PTO has been engaged exclusively to a system memory and a first property memory;
    recording, while the vehicle is in a second state different than the first state, an accumulated time that the PTO has been engaged exclusively to the system memory and a second property memory without recording to the first property memory; and
    selectively erasing contents of the first property memory while preserving contents of the second property memory and the system memory.

6. The method of claim 5, further comprising:
    detecting, while the vehicle is in the first state, when the prime mover is running; and
    recording, while the vehicle is in the first state, an accumulated time that the prime mover has been running exclusively to the system memory and the first property memory.

7. The method of claim 5, further comprising determining, while the vehicle is in the first state, an accumulated volume of fuel used by the prime mover, and recording the accumulated volume of fuel used to the first property memory.

8. The method of claim 5, further comprising displaying, with an onboard display, the accumulated time that the PTO has been engaged as recorded by both the system memory and the first property memory.

9. A turf maintenance vehicle comprising:
    a chassis supported upon a ground surface by a plurality of ground-engaging members;
    a prime mover supported by the chassis;
    an implement connected to the chassis, the implement operatively connected to the prime mover when a power take-off (PTO) is engaged, and operatively disconnected from the prime mover when the PTO is disengaged, the implement adapted to perform a maintenance task; and
    an electronic controller (EC) carried on the chassis, the EC comprising a system memory, a first property memory, and a second property memory, wherein the system memory, the first property memory, and the second property memory each include a first storage portion adapted to record an accumulated time during which the PTO has been engaged, wherein the EC is configured to: simultaneously record the accumulated time to the system memory and to the first property memory without recording to the second property memory when the vehicle is in a first state; and simultaneously record the accumulated time to the system memory and to the second property memory without recording to the first property memory when the vehicle is in a second state.

10. The vehicle of claim 9, wherein the system memory, the first property memory, and the second property memory each include a second storage portion adapted to record an accumulated time during which the prime mover has been running.

11. The vehicle of claim 10, wherein the first property memory and the second property memory each comprise a third storage portion adapted to record a volume of fuel used by the prime mover.

12. The vehicle of claim 9, wherein the first and the second property memory are each independently resettable.

13. The vehicle of claim 12, wherein the EC further comprises a third property memory that is also independently resettable.

14. The method of claim 1, wherein the first state is defined by the vehicle being located on a first physical property, and the second state is defined by the vehicle being located on a second physical property different than the first physical property.

15. The method of claim 1, further comprising selectively erasing contents of the first property memory while preserving contents of the second property memory and the system memory.

16. The method of claim 5, wherein the first state is defined by the vehicle being located on a first physical property, and the second state is defined by the vehicle being located on a second physical property different than the first physical property.

* * * * *